United States Patent
Erickson et al.

(10) Patent No.: US 11,953,880 B2
(45) Date of Patent: Apr. 9, 2024

(54) DYNAMIC INDEXING FOR MOVING PARTS IN A FABRICATION ENVIRONMENT

(71) Applicant: The Boeing Company, Chicago, IL (US)

(72) Inventors: Jordan Seth Erickson, Federal Way, WA (US); Michael Kenneth-Que Louie, Renton, WA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 17/454,252

(22) Filed: Nov. 10, 2021

(65) Prior Publication Data

US 2022/0155754 A1 May 19, 2022

Related U.S. Application Data

(60) Provisional application No. 63/115,029, filed on Nov. 18, 2020.

(51) Int. Cl.
*B29C 70/38* (2006.01)
*B32B 37/00* (2006.01)
(Continued)

(52) U.S. Cl.
CPC .......... *G05B 19/4099* (2013.01); *B29C 70/38* (2013.01); *B29C 70/384* (2013.01);
(Continued)

(58) Field of Classification Search
CPC .............. G05B 19/4099; G05B 19/401; G05B 2219/49114; B29C 70/38; B29C 70/384;
(Continued)

(56) References Cited

U.S. PATENT DOCUMENTS

| 5,117,348 | A | * | 5/1992 | Romero | B29C 70/388 156/350 |
| 8,514,412 | B2 | * | 8/2013 | Bennison | G01B 11/02 356/626 |
| 2009/0301648 | A1 | * | 12/2009 | Hogg | B29C 70/386 156/230 |

FOREIGN PATENT DOCUMENTS

| DE | 102010015027 A1 | | 10/2011 | |
| EP | 2383106 A1 | | 2/2011 | |
| EP | 2505343 | * | 6/2011 | ............. B29C 70/38 |

OTHER PUBLICATIONS

European Patent Office Extended Search Report, dated Apr. 28, 2022, regarding Application No. 21207621.0, 6 pages.
(Continued)

*Primary Examiner* — Alison L Hindenlang
*Assistant Examiner* — Shibin Liang
(74) *Attorney, Agent, or Firm* — Yee & Associates, P.C.

(57) ABSTRACT

Systems and methods are provided for indexing a layup mandrel. One embodiment is a method for indexing a layup mandrel for a composite part. The method includes identifying a surface of a layup mandrel that travels in a process direction during fabrication of a composite part, placing a lamination head in contact with the surface, traversing the surface of the layup mandrel with the lamination head, acquiring a stream of 3D coordinates of the lamination head as the lamination head traverses the surface, characterizing the layup mandrel based on the stream of 3D coordinates, altering a Numerical Control (NC) program that directs layup of fiber reinforced material at the layup mandrel, based on a difference between the alignment of the layup mandrel and a nominal alignment of the layup mandrel.

33 Claims, 17 Drawing Sheets

(51) Int. Cl.
  *B32B 38/18*     (2006.01)
  *G05B 19/401*    (2006.01)
  *G05B 19/4099*   (2006.01)
  *B29L 31/30*     (2006.01)

(52) U.S. Cl.
  CPC .......... *B32B 37/00* (2013.01); *B32B 37/0053* (2013.01); *B32B 38/1841* (2013.01); *G05B 19/401* (2013.01); *B29L 2031/3082* (2013.01); *B32B 2309/72* (2013.01); *G05B 2219/49114* (2013.01)

(58) Field of Classification Search
  CPC . B32B 37/00; B32B 37/0053; B32B 38/1841; B32B 2309/72; B29L 2031/3082
  See application file for complete search history.

(56) References Cited

OTHER PUBLICATIONS

Netherlands Patent Office Written Opinion and Search Report with English Translation, dated Jun. 18, 2021, regarding Application No. NL2027422, 9 pages.

* cited by examiner

FIG. 18

| NOMINAL POSITION | ACTUAL POSITION | DEVIATION | TIME |
|---|---|---|---|
| 25.3, 37.0, 14.3 | 25.1, 37.2, 14.2 | -0.2, 0.2, -0.1 | 19:21:32.15 |
| 25.8, 37.0, 14.3 | 25.9, 37.1, 14.3 | 0.1, 0.1, 0.0 | 19:21:32.25 |
| 26.2, 37.0, 14.3 | 26.0, 37.0, 14.2 | -0.2, 0.0, -0.1 | 19:21:32.35 |
| 26.6, 37.3, 14.3 | 26.7, 37.3, 14.3 | 0.1, 0.0, 0.0 | 19:21:32.45 |

1800

DYNAMIC INDEXING FOR MOVING PARTS IN A FABRICATION ENVIRONMENT

CROSS-REFERENCE TO RELATED APPLICATION

This application claims the benefit of U.S. Provisional Patent Application Ser. No. 63/115,029, filed Nov. 18, 2020, and entitled "Dynamic Indexing for Moving Parts In a Fabrication Environment;" which is incorporated herein by reference in its entirety.

FIELD

The disclosure relates to the field of fabrication, and in particular, to fabrication of composite parts.

BACKGROUND

In order to fabricate composite parts, tows of unhardened fiber-reinforced composite materials are precisely laid-up onto a layup mandrel. The mandrel itself must be precisely positioned within a stationary work cell, or the tows will not be placed in desired locations on the mandrel. Therefore, indexing must be performed upon the stationary mandrel in the cell, in order to ensure that the tows do not exhibit an out of tolerance condition, including laps or gaps when they are later placed onto the mandrel. If the mandrel is not in a desired position within the cell, it must be re-oriented and re-indexed, which results in increased time and labor.

Therefore, it would be desirable to have a method and apparatus that take into account at least some of the issues discussed above, as well as other possible issues.

SUMMARY

The various examples described herein provide dynamic systems for indexing a lamination machine to a layup mandrel or other rigid tool that proceeds in a process direction during fabrication (e.g., periodically, continuously, etc.). These dynamic systems enable indexing to be performed in environments where the rigid tool is regularly moved, unlike environments that expect a rigid tool to be held stationary within a cell. These dynamic systems may also provide input for modifying Numerical Control (NC) programs, in order to account for deviations of a rigid tool from an expected position and/or orientation. This eliminates the need to re-position the rigid tool if the rigid tool is not perfectly aligned.

One example is a method for indexing a layup mandrel for a composite part. The method includes identifying a surface of a layup mandrel that travels in a process direction during fabrication of a composite part, placing a lamination head in contact with the surface, traversing the surface of the layup mandrel with the lamination head, acquiring a stream of 3D coordinates of the lamination head as the lamination head traverses the surface, characterizing the layup mandrel based on the stream of 3D coordinates, altering a Numerical Control (NC) program that directs layup of fiber reinforced material at the layup mandrel, based on a difference between the alignment of the layup mandrel and a nominal alignment of the layup mandrel.

A further example is a system for indexing a layup mandrel for a composite part. The system includes a lamination head comprising: a roller, a suspension that enables deflection of the roller, a position sensor that measures deflection of the roller, and a dispenser that dispenses tows of fiber-reinforced material. The system further includes a controller that identifies a surface of a layup mandrel that travels in a process direction during fabrication of a composite part, directs the lamination head to place a roller of a lamination head in contact with the surface, directs the lamination head to traverse the surface with the roller, acquires a stream of 3D coordinates of the roller as the roller traverses the surface, determines an alignment of the layup mandrel based on the stream of 3D coordinates, and alters a Numerical Control (NC) program that directs layup of fiber reinforced material at the layup mandrel, based on a difference between the alignment of the layup mandrel and a nominal alignment of the layup mandrel.

A further example is an apparatus for indexing a layup mandrel for a composite part. The apparatus includes a lamination head comprising a roller, a suspension that enables deflection of the roller, a position sensor that measures deflection of the roller, and a dispenser that dispenses tows of fiber-reinforced material.

Other illustrative embodiments and examples (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 18 is a report indicating a difference between a nominal position and actual position of an indexing head in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up onto a rigid layup mandrel in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
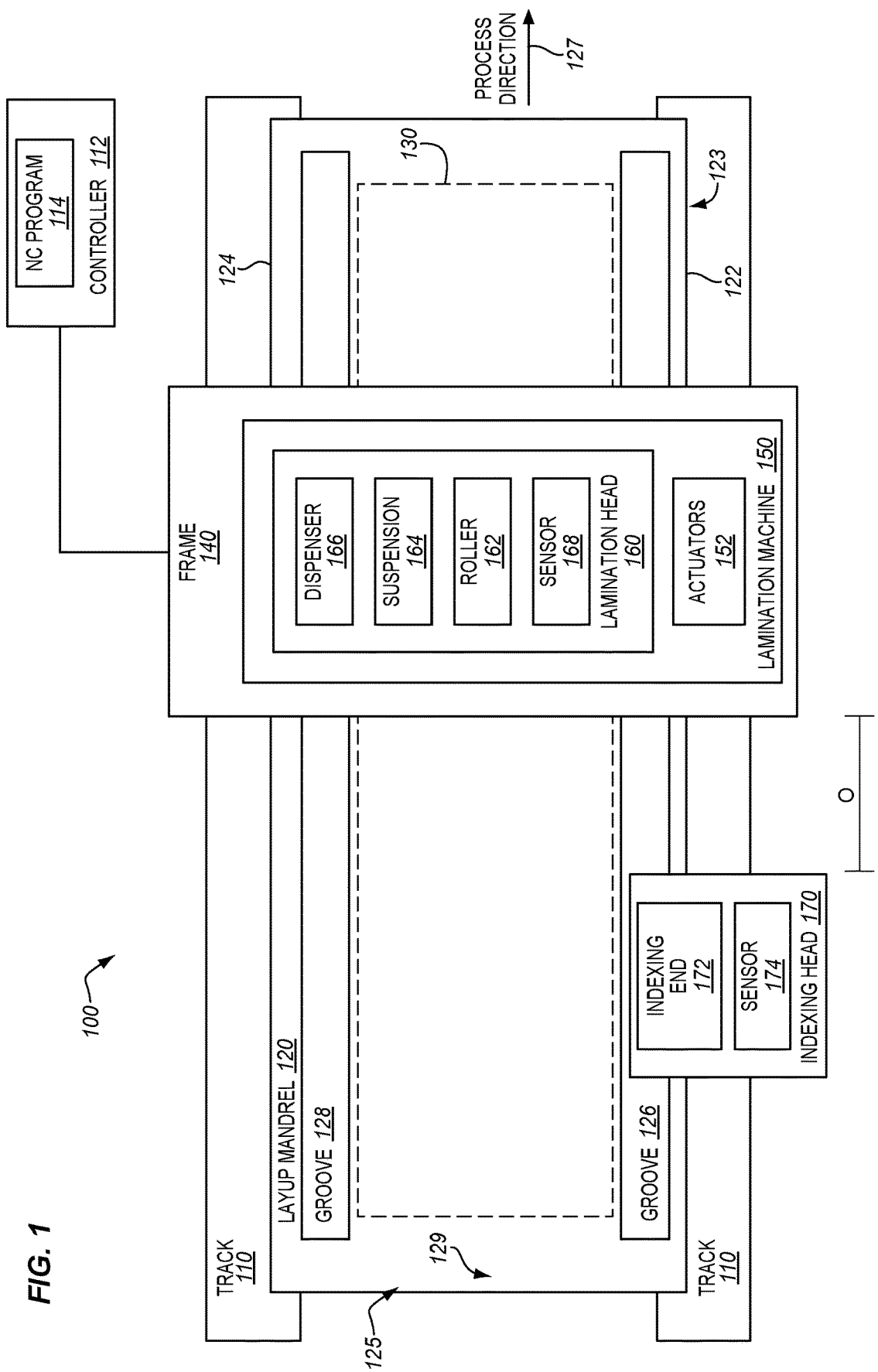
FIG. 1 is a block diagram of a line assembly system for a composite part in an illustrative embodiment.

FIG. 1 is a block diagram of a line assembly system 100 for a composite part in an illustrative embodiment. Line assembly system 100 comprises any system, device, or component operable to iteratively pulse a layup mandrel 120 (e.g. for a half-barrel section of fuselage approximately twenty to forty feet long) along a track 110 or other pathway in a process direction 127 (e.g., via an Autonomous Guided Vehicle (AGV). For example, the layup mandrel 120 may be pulsed for its entire length, a fraction of its length (e.g., a few inches), or may be continuously moved in the process direction 127. Line assembly system 100 is further capable of laying up a laminate comprising layers of fiber-reinforced material onto the layup mandrel 120 (e.g., in pauses between pulses, or during continuous motion of the layup mandrel 120).

In this embodiment, the line assembly system 100 includes tracks 110, which transport the layup mandrel 120 (or other rigid tool 125) in a process direction 127. The layup mandrel 120 includes a first side surface 122, a second side surface 124, and a layup surface 129. A lamination machine 150 applies a laminate (not shown in FIG. 1) in layup region 130 of the layup mandrel 120. This laminate will be hardened into a composite part after the layup mandrel 120 is further transported in the process direction 127. The operations of the lamination machine 150 and/or other stations disposed in serial along the process direction 127 are managed by controller 112. In one embodiment, controller 112 determines a progress of the layup mandrel 120 along the track 110 (e.g., based on input from a technician, in accordance with an automated process such as input from a camera or physical sensor, such as a linear or rotary actuator), and uses this input to manage the operations of the lamination machine 150 in accordance with instructions stored in a Numerical Control (NC) program. Controller 112 may be implemented, for example, as custom circuitry, as a hardware processor executing programmed instructions, or some combination thereof.

The lamination machine 150 moves along a frame 140 via actuators 152, and includes a lamination head 160 that performs layup of fiber-reinforced material. Lamination head 160 places fiber-reinforced material upon layup mandrel 120 or a prior placed ply of fiber-reinforced material to create a lamination. The lamination head 160 includes a roller 162 that travels along a layup surface 129 of the layup mandrel 120, and further includes a suspension 164 which permits limited displacement of the roller 162 along all three axes. The suspension 164 supports the roller 162 while permitting limited deflection of the roller 162 by the layup surface 129. For example, the suspension 164 may press the roller 162 into the layup surface 129, resulting in deflection from a default position if the layup surface 129 is above or below an expected position. The lamination head 160 further includes a position sensor 168 (e.g., a linear sensor, laser sensor, infrared sensor, etc.) that detects displacement of the roller 162 along three dimensions. Lamination head 160 further includes a dispenser 166 which applies tows of unidirectional fiber reinforced material (e.g., CFRP) in accordance with instructions from the NC program 114 stored in controller 112.

Because the layup mandrel 120 may be tens of feet long, even small angular deviations of the layup mandrel 120 from an expected orientation result in substantial differences in the locations where tows are placed by the lamination machine 150. For example, an angular deviation of less than a degree may result in inches of positional offset at one or more locations on the layup mandrel 120. This presents a problem because tows are expected to be placed in precise locations and orientations at the layup mandrel 120 (e.g., locations that are specified to within fractions of an inch). Furthermore, gaps and/or overlaps between tows beyond tolerance are not permissible. To address these concerns and ensure that layup is performed in a desired manner without a need to reorient the layup mandrel 120, the line assembly system 100 includes one or more of the following components discussed below to facilitate indexing of the layup mandrel 120 to the lamination machine 150. Furthermore, localized variations may exist at the layup mandrel 120, for example if a component placed at the layup mandrel 120 deviates from an expected position.

In one embodiment, the roller 162 of the lamination head 160 utilizes the position sensor 168 to determine displacement over time as the roller 162 proceeds along a layup surface 129 of the layup mandrel 120. For example, the roller 162 may traverse first side surface 122 or second side surface 124 by following a nominal (expected) path (i.e., a path comprising a series of 3D coordinates), and deviations from the nominal path 123 may be recorded by the position sensor 168 at each of multiple locations along the surface(s) that were traversed. Controller 112 may then alter the NC program 114 to account for these differences. It is understood that NC program 114 includes a portion that controls the indexing operations described herein as well as a portion that controls the placement of composites materials such as fiber tows.

In a further embodiment, the lamination machine 150 is placed a predetermined and precisely known offset O from an indexing head 170. In various embodiments, lamination machine 150 includes an indexing head 170, or lamination machine 150 swaps out its lamination head 160 for an indexing head 170. In such an embodiment, the indexing head 170 includes an indexing end 172 that traverses grooves, for example first groove 126 and/or second groove 128, that have been precisely placed onto/machined into the layup mandrel 120 (or other rigid tool 125) (e.g., to within tolerance), and a sensor 174 records positional deviations from an expected nominal path of the indexing end 172 as the indexing end 172 traverses the first groove 126 and/or second groove 128. The deviations may be recorded, for example, once per half-inch of travel of the roller 162, and may be recorded to tolerance requirements. This information may be utilized by controller 112 to update the NC program 114.

In one embodiment, indexing is performed at least according to the following description. A layup mandrel 120 (also referred to herein as a tool, a rigid tool 125, and an arcuate tool) is carried upon a track 110 comprising a rail system (e.g., embedded within the floor, affixed to the floor, etc.). The rails are positioned in locations known to the controller 112. The layup mandrel 120 has been fabricated according to precise dimensions, and this precise layup enables the layup mandrel 120 to be precisely located based on a traversal of its surface(s) (e.g., first side 122 and/or second side 124) or groove(s) (e.g., first groove 126 and/or second groove 128). Thus, once this rigid tool 125 has been traversed by a roller 162 or indexing head 170, the 3D position and orientation of the rigid tool 125 is known, without the need for a full scan via probes or optical technology at each station in an assembly line.

Traversal by a roller 162 or indexing head 170 therefore operates as a short cut to characterizing surface geometry and orientation, without the need for a full scan via probes or optical technology at each station, such as lamination machine 150, in an assembly line. This technique benefits from the rigidity of the layup mandrel 120 (or its lack of deflection, particularly deflection outside of tolerance) as it passes through the lamination machine 150 from one micro pulse to the next. A micro pulse is an advancement of the layup mandrel 120 by a distance less than the length of the layup mandrel 120. A pulse is an advancement of the layup mandrel 120 by a distance equal to or greater than the length of the layup mandrel 120. The preciseness of the tooling, the layup upon the tooling, and the lack of change to the tooling and the layup due to rigidity of the system from one micro pulse to the next enables characterization of the structure being micro pulsed, without rescanning after each pulse. The pulsing does not sufficiently disrupt the configuration of the layup mandrel 120 nor does it disrupt a preform upon it. Hence, the technique of characterization may be repeated successfully after each micro pulse.

Because of the precise indexing performed, the lamination machine 150 (or another other tool) at a station in an assembly line knows exactly where it is relative to the rigid tool 125, such as layup mandrel 120, before work is performed at the layup mandrel 120. The 3D position and orientation of the rigid tool 125 is then established or indexed into any NC programming or other automated system in use at the station. After initially establishing this information, downstream stations or tools may assume that the layup mandrel 120 has not changed its orientation and/or contour as it proceeds, or pulses, along the assembly line. Therefore, no setup time or scanning is needed after each micro pulse of the rigid tool 125 by a distance in the process direction 127 (e.g., a micro pulse of one foot, several inches, a pulse of an entire length of the rigid tool 125, etc.). That is, because the precise shape of the rigid tool 125 is already known (i.e., to within tolerance), traversing sides 122, 124, traversing grooves 126, 128 and/or layup surfaces 129 are precisely fabricated into the layup mandrel 120 enables the controller 112 to determine a precise orientation and/or location of the rigid tool 125 (e.g., to within tolerance) relative to a lamination machine 150. When the two are in a known relationship, layup operations at the lamination machine 150 can be altered to accommodate the rigid tool 125.

In one embodiment, lamination machine 150 comprises one of multiple stations that are disposed along the tracks 110 and are separated in the process direction 127 by less than the length of the rigid tool 125. Work performed by other stations may comprise performing additional layup, inspecting a green (uncured) laminate, and/or performing other tasks.

Illustrative details of the operation of line assembly system 100 will be discussed with regard to FIG. 2. Assume, for this embodiment, that a layup mandrel 120 has proceeded along tracks 110 to a lamination machine 150, but that the precise position and orientation (e.g., to a fraction of an inch and to the hundredth of a degree) of the layup mandrel 120 is not known. Thus, if the lamination machine 150 proceeds according to a "default" NC program and the layup mandrel 120 has even a slight deviation from nominal, laps or gaps may occur that are not within a desired tolerance, and the resulting laminate may have to be reworked.

Figure 2:
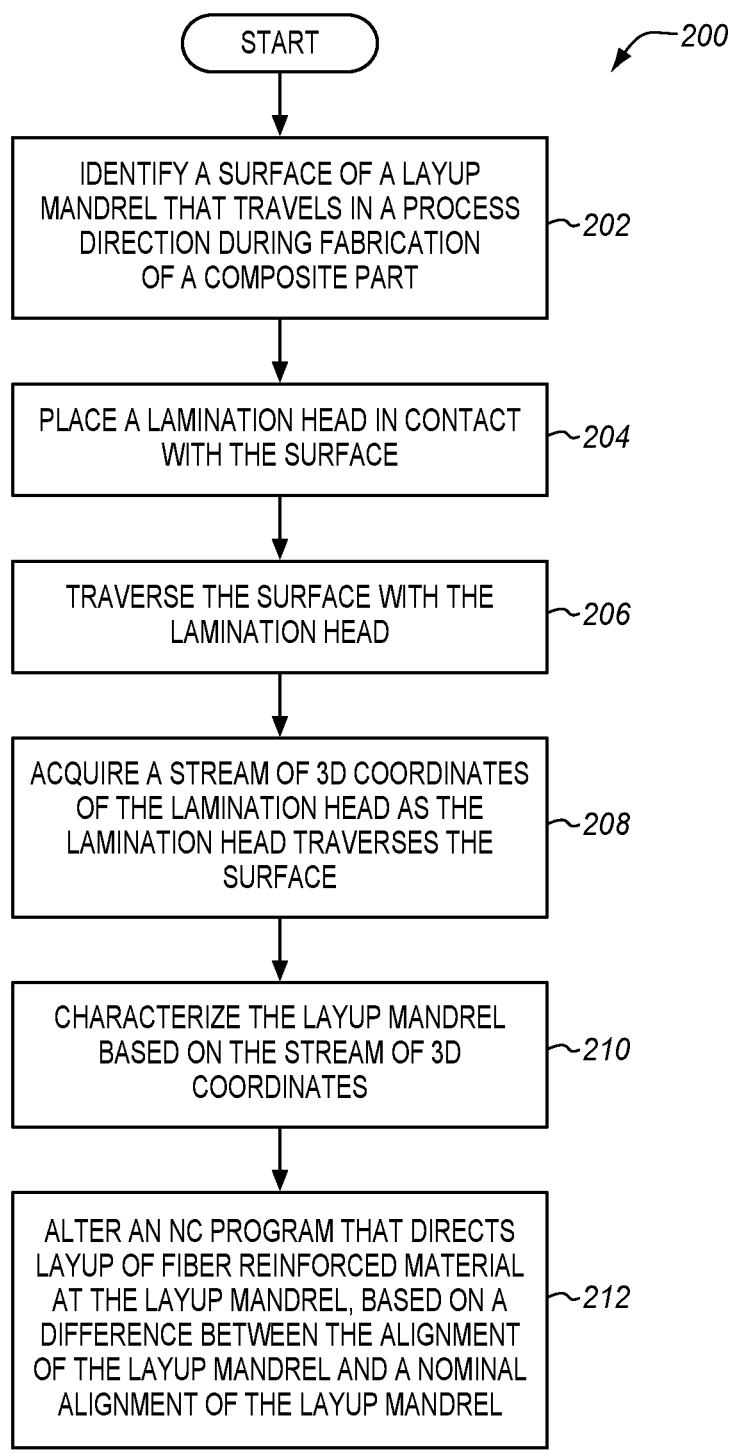
FIG. 2 is a flowchart illustrating a method for operating an indexing system based on the position of a roller for a lamination head in an illustrative embodiment.

FIG. 2 is a flowchart illustrating a method 200 for operating an indexing system based on the position of a roller 162 for a lamination head 160 in an illustrative embodiment. The steps of method 200 are described with reference to line assembly system 100 of FIG. 1, but those skilled in the art will appreciate that method 200 may be performed in other systems. The steps of the flowcharts described herein are not all inclusive and may include other steps not shown. The steps described herein may also be performed in an alternative order.

Initially, a layup surface 129 of the layup mandrel 120 is identified 202 by controller 112. The layup mandrel 120 travels in a process direction 127 during fabrication of a composite part. For example, the layup mandrel 120 may be periodically "micro pulsed" a predetermined distance in the process direction 127 over time (e.g., one foot every fifteen minutes, and/or pulsed the entire length of the layup mandrel 120 every two hours, etc.), or may be continuously moved in the process direction 127 at a predetermined rate (e.g., one inch per minute). The controller 112 may identify the layup surface 129 of the layup mandrel 120 based on preprogrammed information indicating an expected start position of first side surface 122 or second side surface 124 of the layup mandrel 120, or may visually inspect the layup mandrel 120 to identify the first side surface 122 and/or second side surface 124.

The controller 112 directs the lamination machine 150 to place 204 itself (i.e., via the roller 162) in contact with first side surface 122, or second side surface 124. The lamination head 160 traverses 206 the first side surface 122, or second side surface 124 with the roller 162. During this process, the layup mandrel 120 remains in position. The roller 162 proceeds along a nominal path indicative of an expected position of the layup mandrel 120 along its length. As used herein, a "path" is a series of positions that may be measured and compared to a stream of 3D coordinates. If the layup mandrel 120 is not in an expected position and/or orientation, the roller 162 encounters physical resistance from the surface being traversed, and this physical resistance causes the roller 162 to deflect from the nominal path. These deflections are indicative of a surface geometry, such as contour, of the layup surface 129, first side surface 122, and second side surface 124, and are recorded by the position sensor 168.

In the next step, controller 112 acquires 208 a stream of three dimensional (3D) coordinates of the lamination head 160 (i.e. the roller 162) as the lamination head 160 traverses the layup surface 129. This may comprise acquiring a coordinate from the position sensor 168 periodically over time or space (e.g., every tenth of an inch, every tenth of a second, etc.), and storing the stream of coordinates in memory.

Continuing, the controller 112 characterizes 210 (e.g., determines an alignment and/or shape of the layup mandrel 120 to within a tolerance) based on the stream of 3D coordinates. This may be performed by loading a known shape of the layup mandrel 120 into memory, and applying a mathematical transform to a nominal alignment of the shape that causes the shape to match the stream of 3D coordinates. In further embodiments, the alignment of the layup mandrel 120 is more generally determined as either aligned or not aligned, based whether the stream of 3D coordinates is within a tolerance of the nominal path (e.g., a fraction of an inch of the nominal path).

Finally, the controller 112 alters 212 the NC program 114 that directs layup of fiber reinforced material at the layup mandrel 120, based on a difference between the alignment of the layup mandrel 120 and a nominal alignment of the layup mandrel 120. In one embodiment, this comprises applying a mathematical transform to coordinates found in instructions in the NC program 114, based on a mathematical transform that was determined earlier. In a further embodiment, this comprises identifying locations in the NC program 114 that correspond with locations in the nominal path, and altering the locations in the NC program 114 by an amount equal to the differences detected from the nominal path in the stream of 3D coordinates. In yet another embodiment, the NC program 114 is altered in real time as needed to accommodate the laid down thickness of the laid down material already placed upon the layup mandrel 120 at a particular point during the layup process.

Method 200 provides a technical benefit over prior systems and techniques, because it enables a rigid tool 125 to be precisely indexed to a lamination machine 150, without the need for additional indexing equipment of any kind. In particular, probes and other devices are not needed to perform indexing, and the lamination machine 150 is capable of adapting to changes from a nominal orientation, without having to re-orient a layup mandrel 120. In an embodiment, the layup mandrel 120 may weigh hundreds or even thousands of pounds and would be difficult to re-orient as needed.

Figure 3:
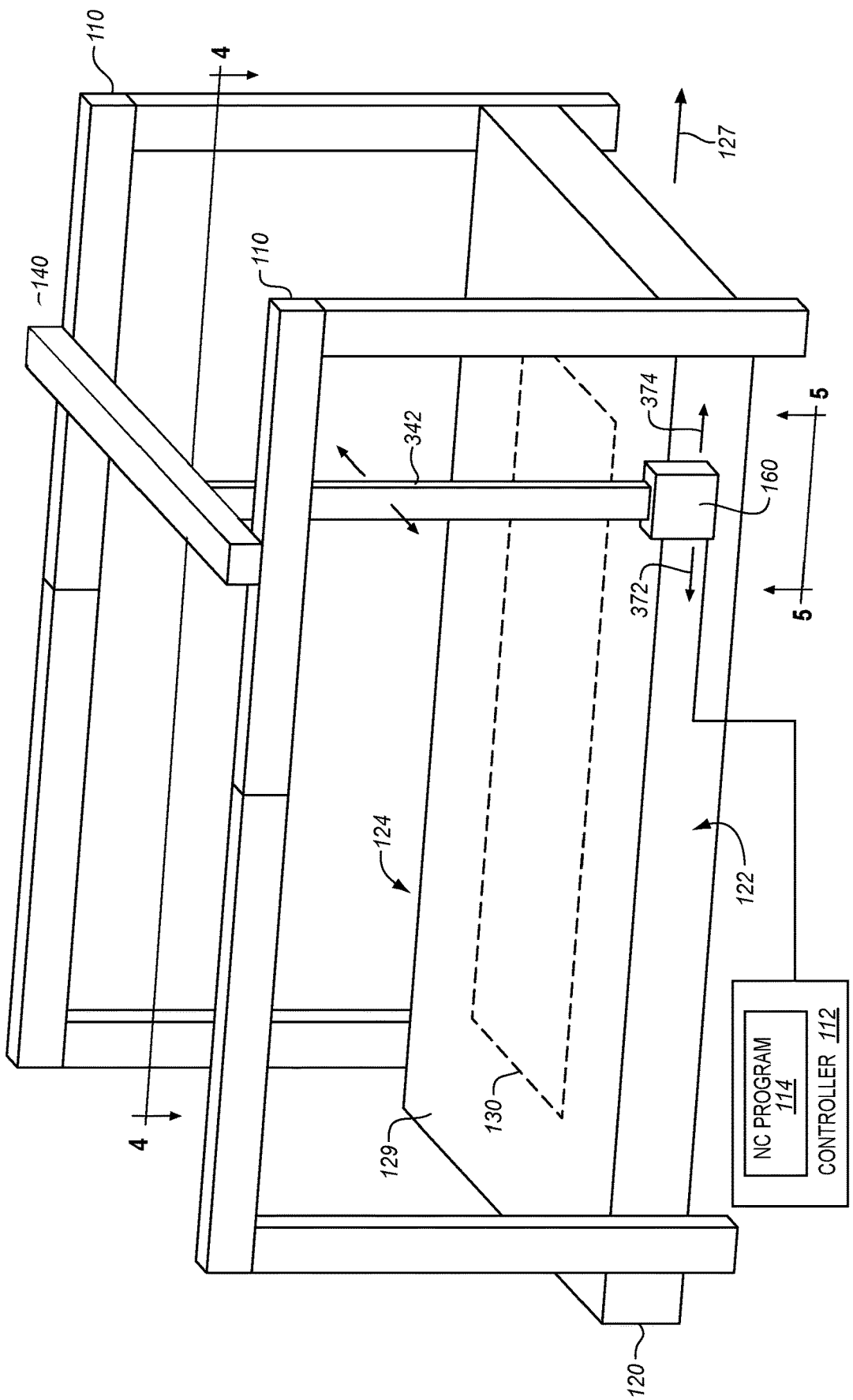
FIG. 3 is a perspective view of a lamination head traversing a surface of a layup mandrel in an illustrative embodiment.

FIG. 3 is a perspective view of lamination head 160 traversing first side surface 122 of a layup mandrel 120 in an illustrative embodiment. According to FIG. 3, the layup mandrel 120 proceeds in a process direction 127, and includes first side surface 122 and second side surface 124. The lamination head 160 will perform layup of fiber-reinforced material along layup region 130 between first side surface 122 and second side surface 124, and is mounted to an extensible arm 342 (e.g., a robotic arm formed from a kinematic chain of rigid bodies and actuators, a telescopic arm, etc.) that moves laterally with respect to frame 140 as frame 140 moves along track 110. The frame 140 moves backward 372 and forward 374 with respect to the process direction 127 along the tracks 110 and/or supports (not shown). The lamination head 160 in FIG. 3 is shown as performing an initial indexing operation by traversing the first side surface 122 and second side surface 124, prior to initiating layup at the layup mandrel 120. These operations may be performed during continuous motion of the layup mandrel 120 (e.g., at a slow rate of speed), or during pauses between pulses of the layup mandrel 120 in the process direction 127. Furthermore, these operations could also occur during each micro pulse, pulse and/or layup operations may occur during pauses between micro pulses or pulses.

Figure 4:
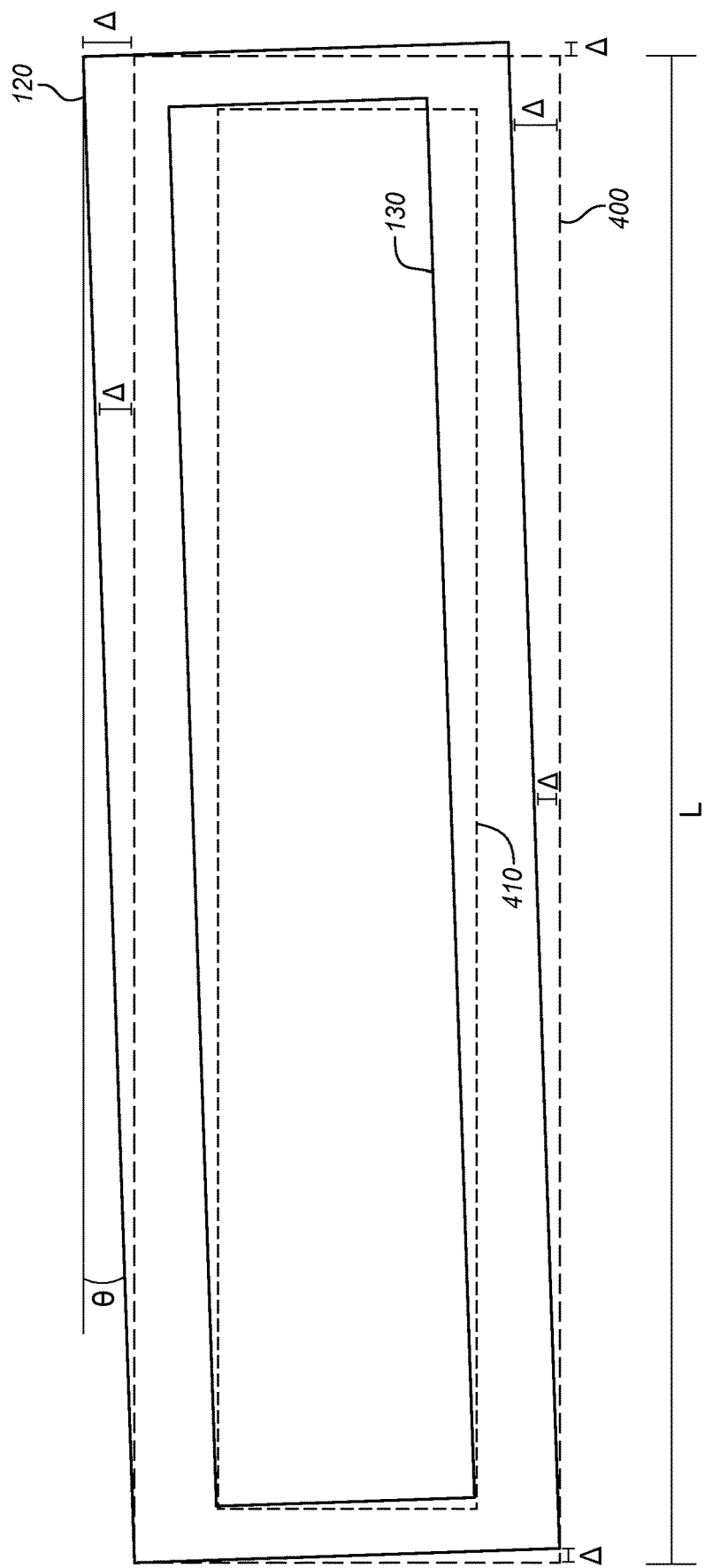
FIG. 4 is a top view of a rigid tool that is not within a nominal orientation in an illustrative embodiment.

FIG. 4 is a top view of a rigid tool 125 (e.g., layup mandrel 120) that is not within a nominal orientation in an illustrative embodiment, and corresponds with view arrows 4 of FIG. 3. As shown in FIG. 4, the layup mandrel 120 exhibits an angular offset θ from a nominal alignment 400 of less than one degree (the less than one degree offset is shown in exaggeration in FIG. 4). However, the layup mandrel 120 has a length L (e.g., twenty-five feet, forty feet, etc.). This means that differences in position (Δ) accrue that result in deviations of region 130 from nominal layup region 410, and these differences in position may exceed a desired tolerance. Hence, if a default NC program is utilized to lay up fiber reinforced material. Tows of fiber reinforced material result in out-of-tolerance conditions when not placed as desired, necessitating re-work of a laminate prior to or after curing.

Figure 5:
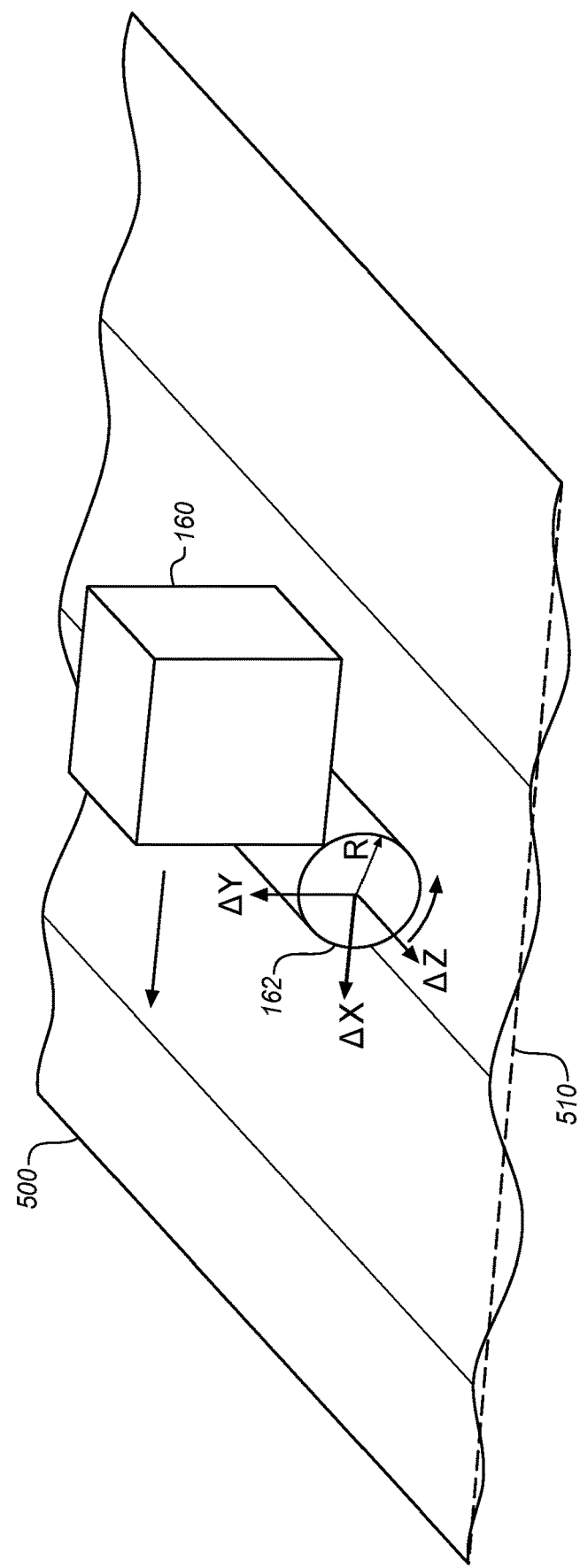
FIG. 5 is a bottom view of a roller traversing a surface that varies with respect to an expected nominal path in an illustrative embodiment.

FIG. 5 is a perspective view of a roller 162 traversing a surface 500 that varies with respect to an expected nominal path in an illustrative embodiment. FIG. 5 corresponds with view arrows 5 of FIG. 3. In this embodiment, a surface 500 includes variations from a nominal path 510. As a lamination head 160 attempts to follow the nominal path with a roller 162, the variations in the surface 500 enforce variations in position (Δx, Δy, and Δz) upon the roller 162. A sensor (e.g., a sensor that measures positional offsets of components of a suspension that enable the roller 162 to deflect) measures these positional offsets for later comparison to a nominal path. In embodiments where the sensor is a rotary sensor that measures degrees of travel/rotation of the roller 162, a larger radius R of the roller 162 may result in reduced precision of measurement. The radius R of the roller 162 may range from less than an inch to several inches. The sensor may measure these offsets to a fraction of an inch along each axis, and may do so at any suitable rate (e.g., kilohertz, megahertz, etc.). In one embodiment, an example of surface 500 is a first side surface 122 of layup mandrel 120, and the lamination head 160 is further operated to traverse second side surface 124 of the layup mandrel 120. In such a case, a controller 112 of the lamination head 160 acquires a second stream of 3D coordinates of the roller 162 as the roller 162 traverses the second surface.

Figure 6:
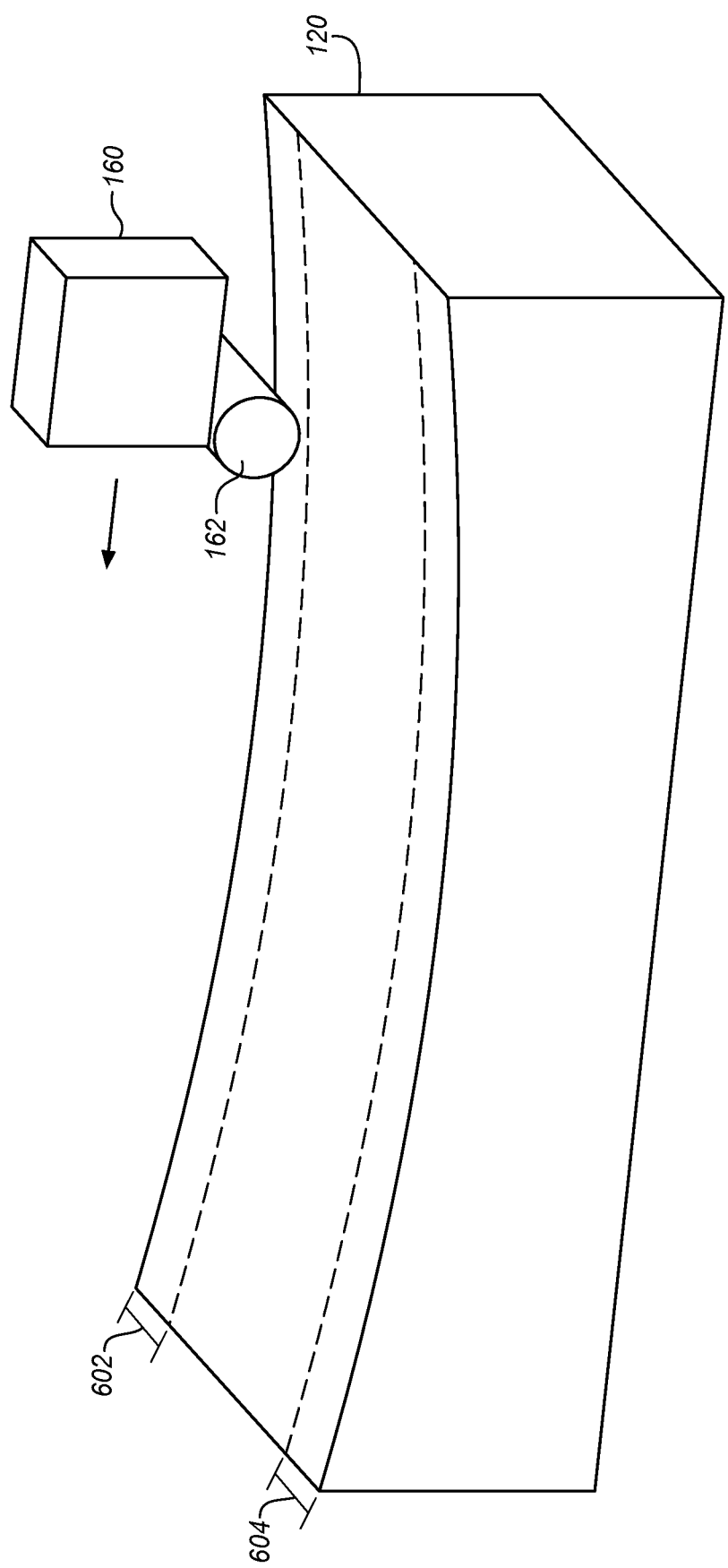
FIG. 6 is a view of a roller traversing a curved surface in an illustrative embodiment.

FIG. 6 is a view of a roller 162 traversing a curved surface in an illustrative embodiment. According to FIG. 6, a lamination head 160 traverses the surface 602 and the surface 604 of a layup mandrel 120. By traversing two surfaces at different sides of the layup mandrel 120, an orientation of the layup mandrel 120 along X, Y, and Z axes may be rapidly and precisely determined.

Figure 7:
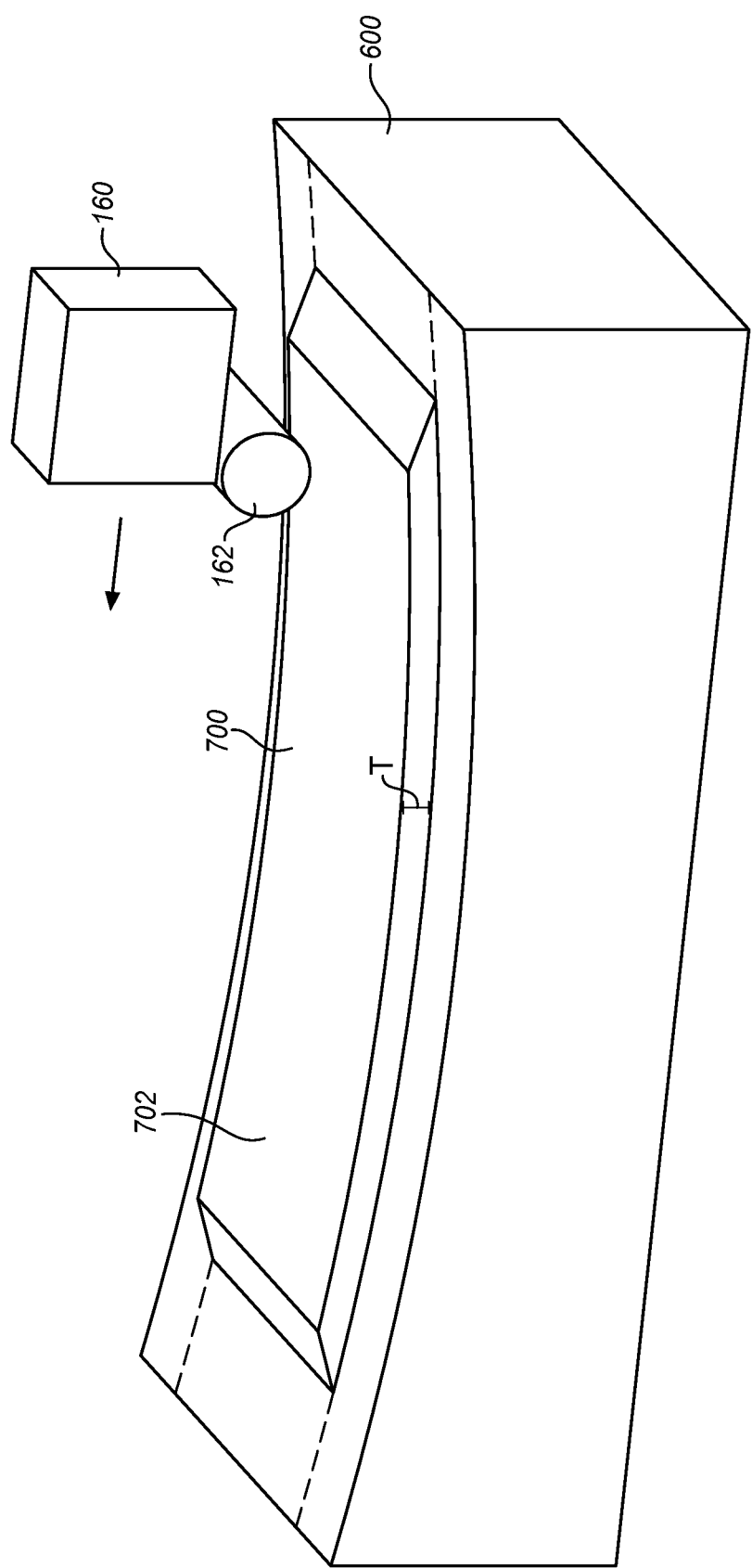
FIG. 7 is a view of a roller traversing a laid-up laminate in an illustrative embodiment.
Figure 11:
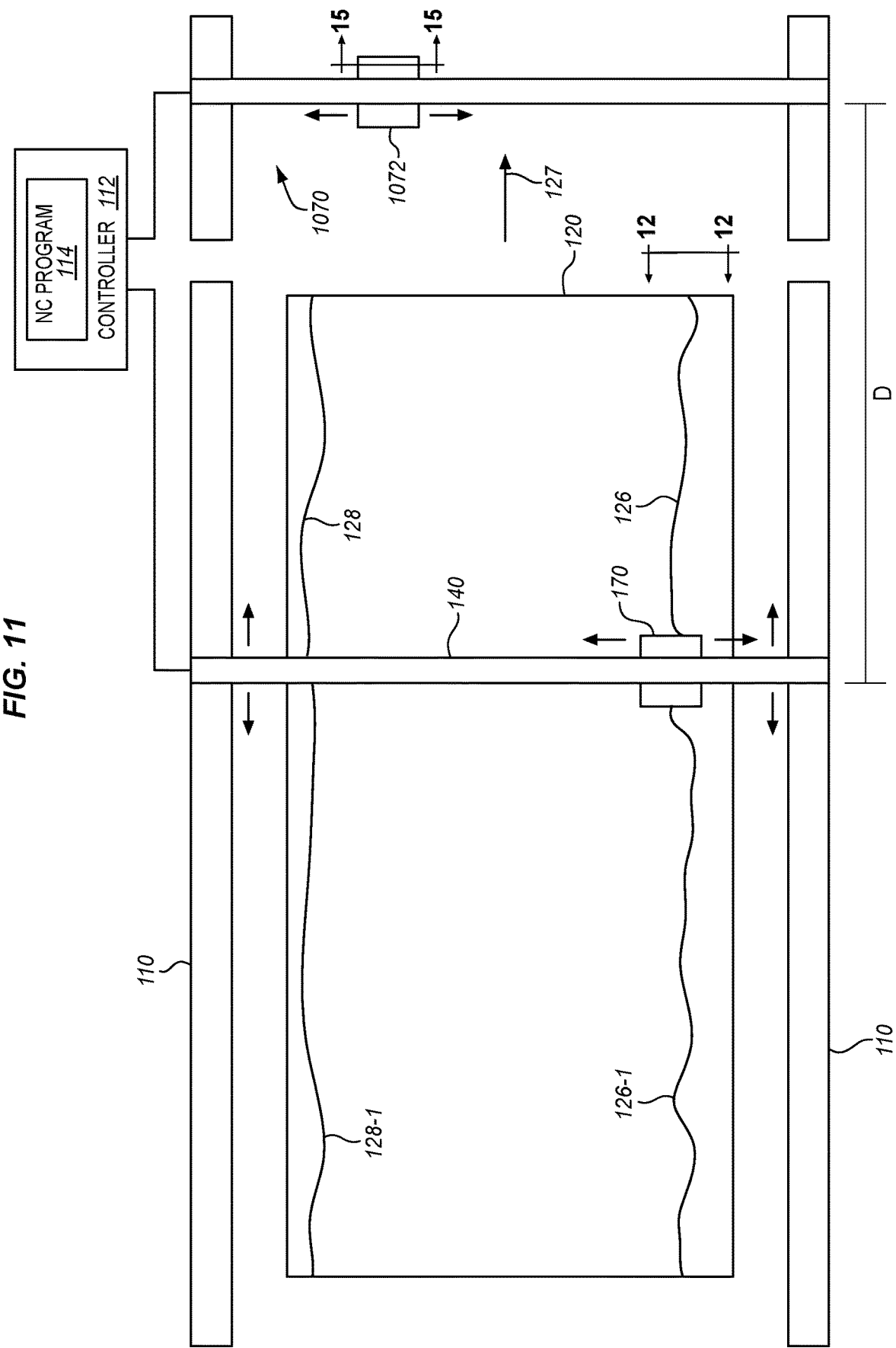
FIG. 11 is top view of an indexing head that follows a groove in a rigid tool in order to index the rigid tool in an illustrative embodiment.

FIG. 7 is a view of a roller 162 traversing a laid-up laminate 700 in an illustrative embodiment. According to FIG. 7, a position of the roller 162 as it follows a surface 702 defined by laminate 700 is actively tracked during layup to acquire a second stream of 3D coordinates. This information enables a thickness of a resulting laminate 700 to be determined, and this information (e.g., the second stream of 3D coordinates, along with any offset information that was previously determined) is passed to a downstream lamination machine 1070 having a downstream lamination head 1072 (e.g., as shown in FIG. 11 below) separated from the lamination head 160 by a distance D in the process direction 127. The downstream lamination machine 1070 updates its own NC program using measurements from the lamination head 160 and/or downstream lamination head 1072.

Figure 8:
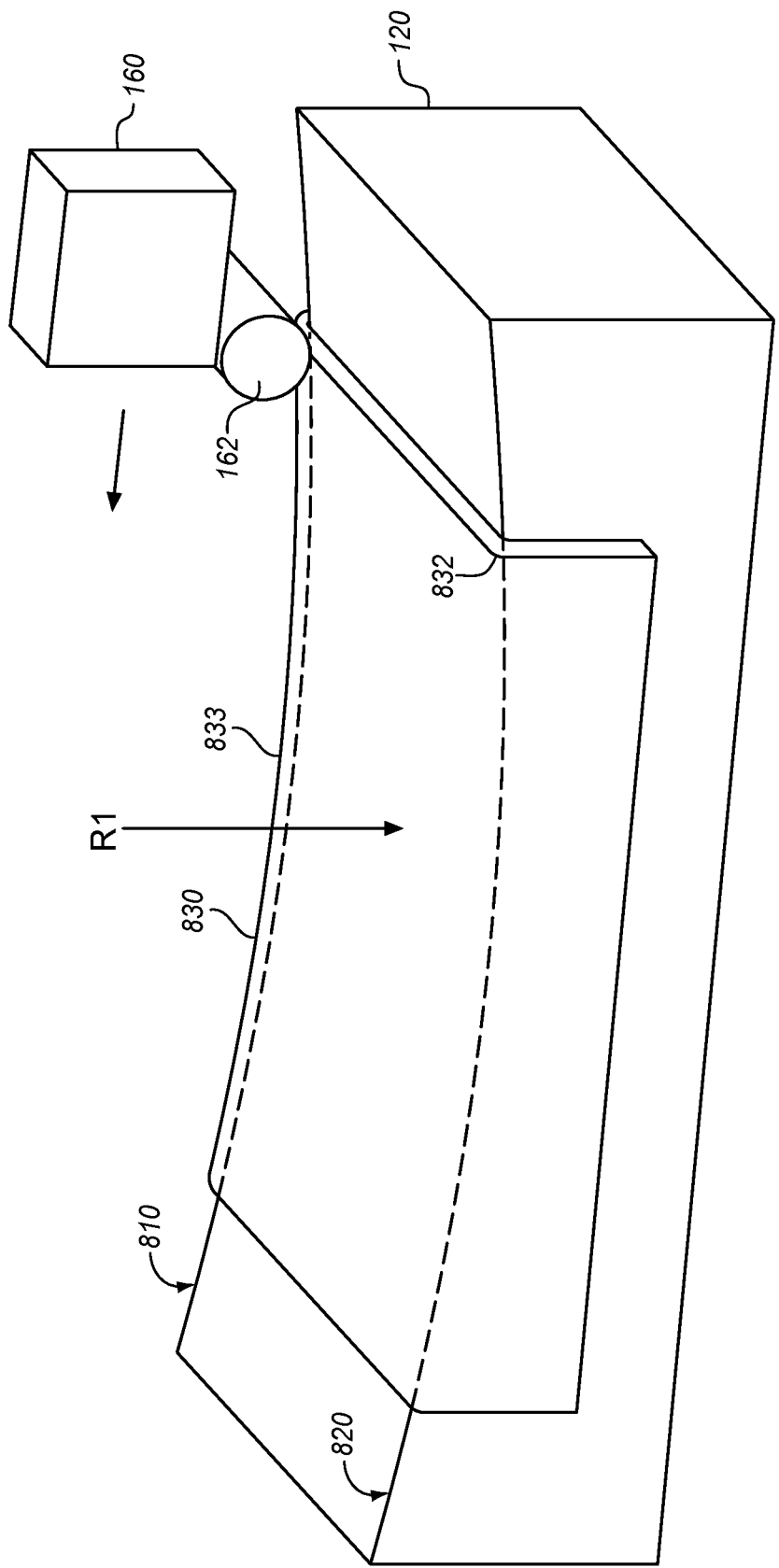
FIG. 8 is a view of a roller traversing a laid-up laminate that is laid-up around a tight radius in an illustrative embodiment.

FIG. 8 is a view of a roller 162 traversing a laid-up laminate 830 that is laid-up around a tight radius in an illustrative embodiment. According to FIG. 8, a roller 162 of a lamination head 160 traverses surfaces of layup mandrel 120 and/or laid-up laminate 830 within desired tolerances, such as surfaces that correspond with an outer radius of a corner 833 of a laminate 830. This may be performed via multiple passes of the roller 162 at different arcuate portions of the curve 832, and integrating the resulting sensor data to characterize the curve 832 along the length of the laminate 830, which wraps around edge 810 and edge 820 of layup mandrel 120. This operation may be performed after receiving laminate 830 from an upstream station, such as lamination machine 150 during layup, or after layup before the layup mandrel 120 proceeds to a downstream lamination machine 1070. The information may then be utilized to alter an existing NC program 114. For example, if the information indicates that a concave radius (not shown) is too small, additional layers may be applied to pad out the outer radius, or the lamination head 160 and NC program 114 are adjusted to account for the difference in geometry. Likewise, if the information indicates that a convex radius R1 is too large, additional layers may be applied to pad out the outer radius to a desired R1, or the lamination head 160 and NC program 114 are adjusted to account for the difference in geometry.

Figure 9:
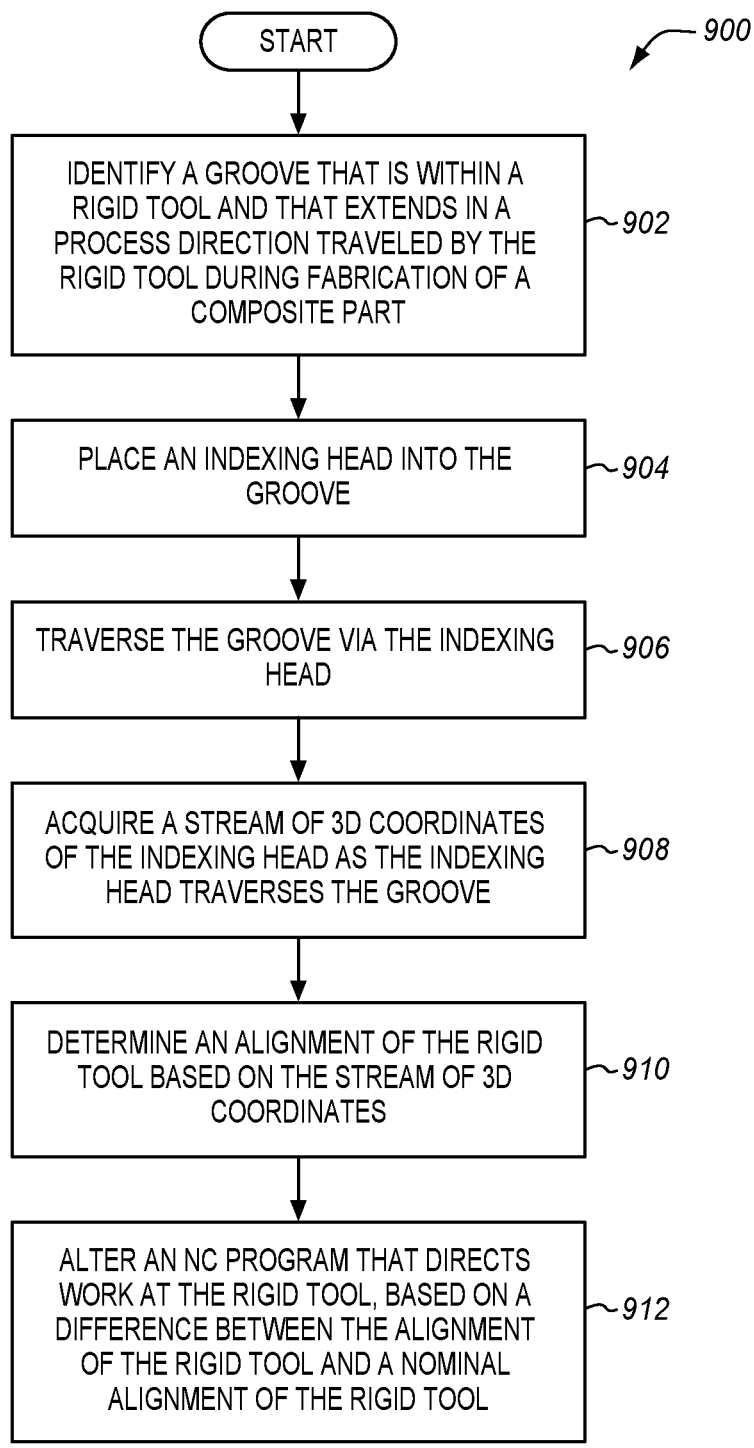
FIG. 9 is a flowchart illustrating a method for operating an indexing head that traverses grooves in a rigid tool in an illustrative embodiment.

FIG. 9 is a flowchart illustrating a method 900 for operating an indexing head 170 that traverses grooves 126, 128 in a rigid tool 125 in an illustrative embodiment. According to FIG. 9, method 900 includes identifying 902 a groove 126 that is within a rigid tool 125 (e.g., a layup mandrel 120 or other component). The groove 126 extends in a process direction 127 traveled by the rigid tool 125 during fabrication of a composite part, and may exhibit an eighth to a quarter inch or more of depth.

An indexing head 170 is placed 904 into the groove 126. For example, the indexing head 170 may be pressed into the groove 126 at a desired level of pressure (e.g., twenty-five pounds per square inch). This physically unites an indexing end 172 of the indexing head 170 with the groove 126, which means that if the groove 126 proceeds in an unexpected direction from a nominal path, it causes the indexing head 170 to deviate as well. The position of the indexing head 170 is measured by a sensor 174 over time. Hence, the deviations are capable of being determined by analyzing a stream of 3D coordinates from the sensor 174.

The groove is traversed 906 via the indexing head 170. That is, controller 112 operates the indexing head 170 to move along a nominal path. If the groove 126 deviates from the nominal path, it causes the indexing head 170 to deflect from its expected position.

A stream of 3D coordinates of the indexing head 170 is acquired 908 as the indexing head 170 traverses the groove 126. Or in addition to or instead of the 3D coordinates, an arc and orientation of the arc of the indexing head 170 is acquired in 908 as the indexing head 170 traverses the groove 126. This may comprise controller 112 sampling input from the sensor 174 at a desired rate (e.g., multiple times per second, multiple times per inch, etc.).

An alignment of the rigid tool 125 is determined in 910 based on the stream of 3D coordinates that was acquired in 908. The determining 910 step may be performed in a similar manner to that of method 200 provided above.

A Numerical Control (NC) program 114 that directs work at the rigid tool 125 is altered in 912, based on a difference between the alignment of the rigid tool 125 and a nominal alignment of the rigid tool 125. The altering 912 step may be performed in a similar manner to the altering 212 step described above.

Figure 10:
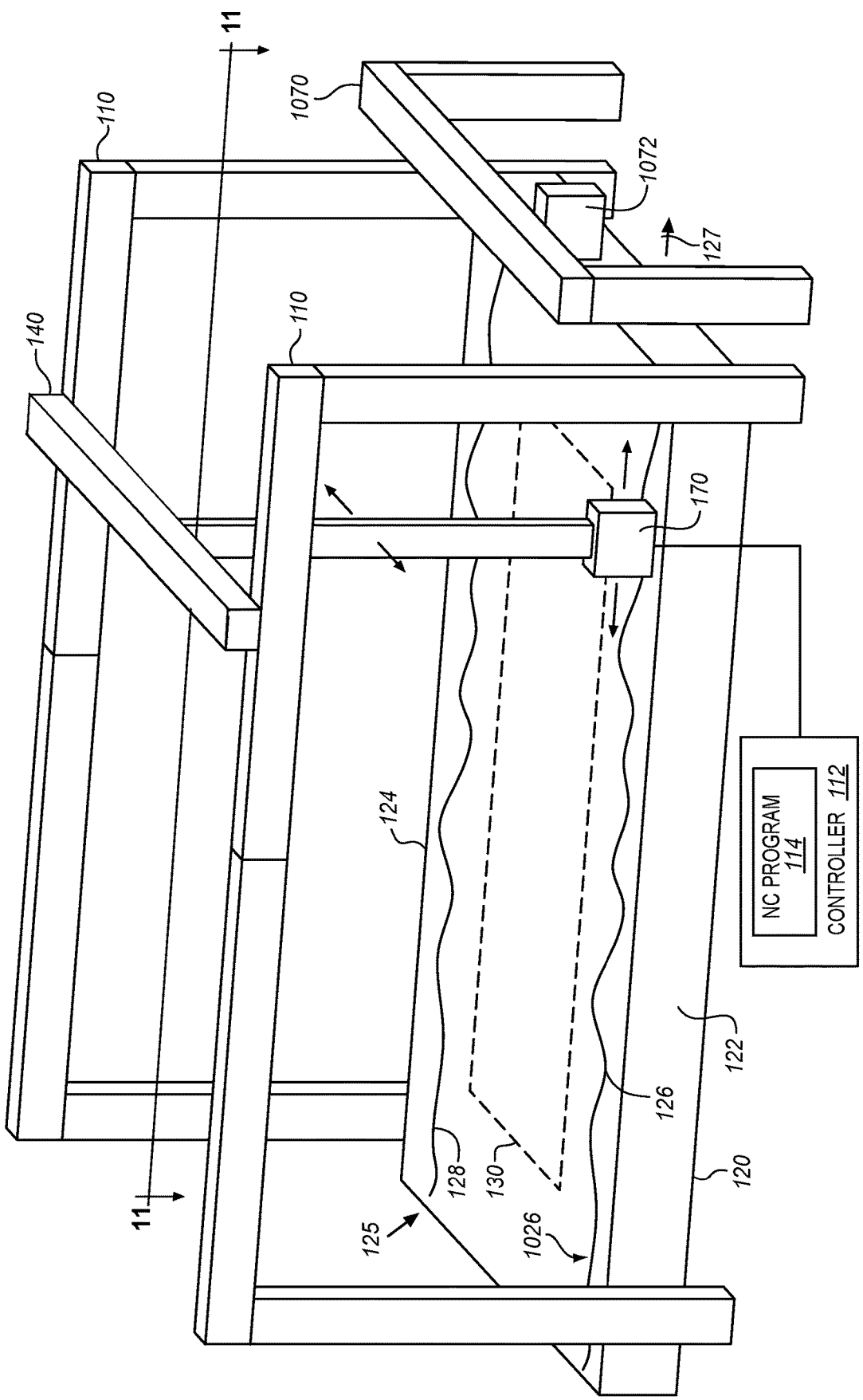
FIG. 10 is a perspective view of an indexing head that follows a groove in a rigid tool in order to index the rigid tool in an illustrative embodiment.

FIG. 10 is a perspective view of an indexing head 170 that follows one or more grooves 126 and 128 in a rigid tool 125 in order to index the rigid tool 125 having a layup region 130 in an illustrative embodiment. The groove 126 follows a series of non-repeating curves 1026. In this embodiment, indexing head 170 moves perpendicular to the process direction 127 along frame 140, and frame 140 moves parallel to the process direction 127 along tracks 110. The rigid tool 125 proceeds downstream in the process direction 127 to downstream lamination machine 1070 having a lamination head 1072 (i.e., a second, or downstream, lamination head). In this embodiment, the downstream lamination machine 1070 is separated from the upstream lamination machine 150 by a distance D (FIG. 11) in the process direction 127.

As shown in FIG. 10, each of the grooves 126, 128 may exhibit a unique series of non-repeating curves. Hence, each location along the groove 126, 128 is uniquely identifiable based on curvature information. By analyzing changes in position of the stream of 3D coordinates, an exact position along the rigid tool 125 may therefore be determined (e.g., to the inch, to a fraction of an inch, etc.). In embodiments wherein the grooves 126, 128 are each unique, the exact groove 126, 128 being traversed may also be determined, based on the curvature of the groove 126, 128. In further embodiments, features of the groove 126, 128 are used to communicate information. This information may include width, depth, angle, or slope of the groove walls, or a cross sectional shape such as a triangular, square, rectangular or half circle shape, or an ellipse. This information may further include varying the cross-sectional shape along the groove 126, 128, placing notches or splines along the walls of the groove 126, 128, or applying magnetic fields with strength that varies down the groove 126, 128, etc. This information may be used to indicate specific regions along the length of each groove 126, 128.

FIG. 11 is a top view of an indexing head 170 that follows a groove 126, 128 in a rigid tool 125 in order to index the rigid tool 125 in an illustrative embodiment, and corresponds with view arrows 11 of FIG. 10. According to FIG. 11, each of the grooves 126 and 128 exhibits a unique, non-repeating series of curves. The rollers 162 discussed herein may be made from rigid materials that do not scratch or damage the underlying rigid tool 125. As the rigid tool 125 may be made from steel or other metals, the rollers 162 may be made, for example, from high-density polyurethane.

Figure 12:
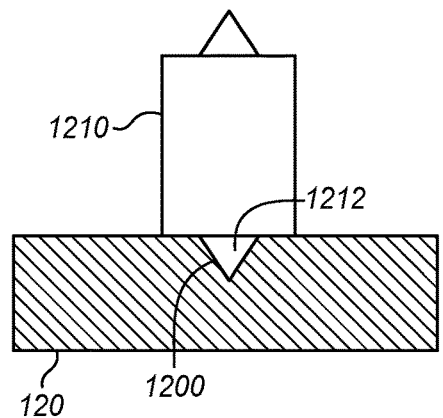
FIGS. 12-14 are front views of rollers for indexing heads that traverse grooves in rigid tools in illustrative embodiments.
Figure 13:
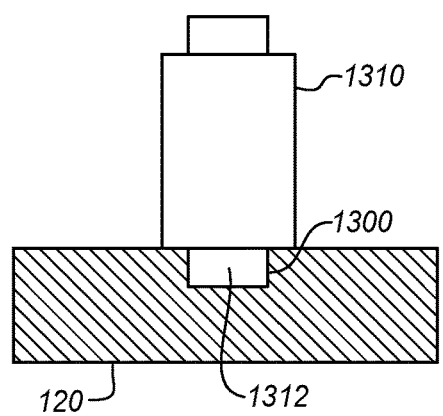
Figure 14:
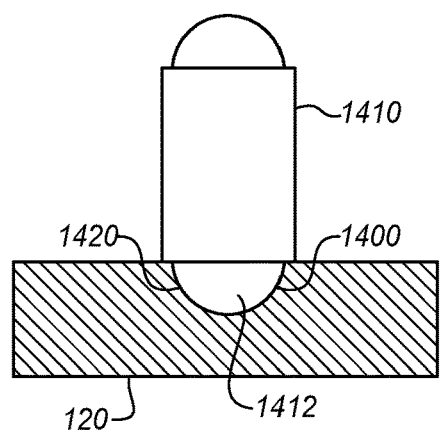

FIGS. 12-14 are front views of different rollers for indexing heads 170 that traverse grooves in rigid tools in illustrative embodiments, and correspond with view arrows 12 of FIG. 11. Specifically, FIG. 12 illustrates a roller 1210 having a triangular notch 1212 for rolling within a triangular groove 1200, FIG. 13 illustrates a roller 1310 having a rectangular notch 1312 for rolling within a rectangular groove 1300, and FIG. 14 illustrates a roller 1410 with a roller ball 1420 having a semicircular notch 1412 for traversing a semicircular groove 1400.

Figure 15:
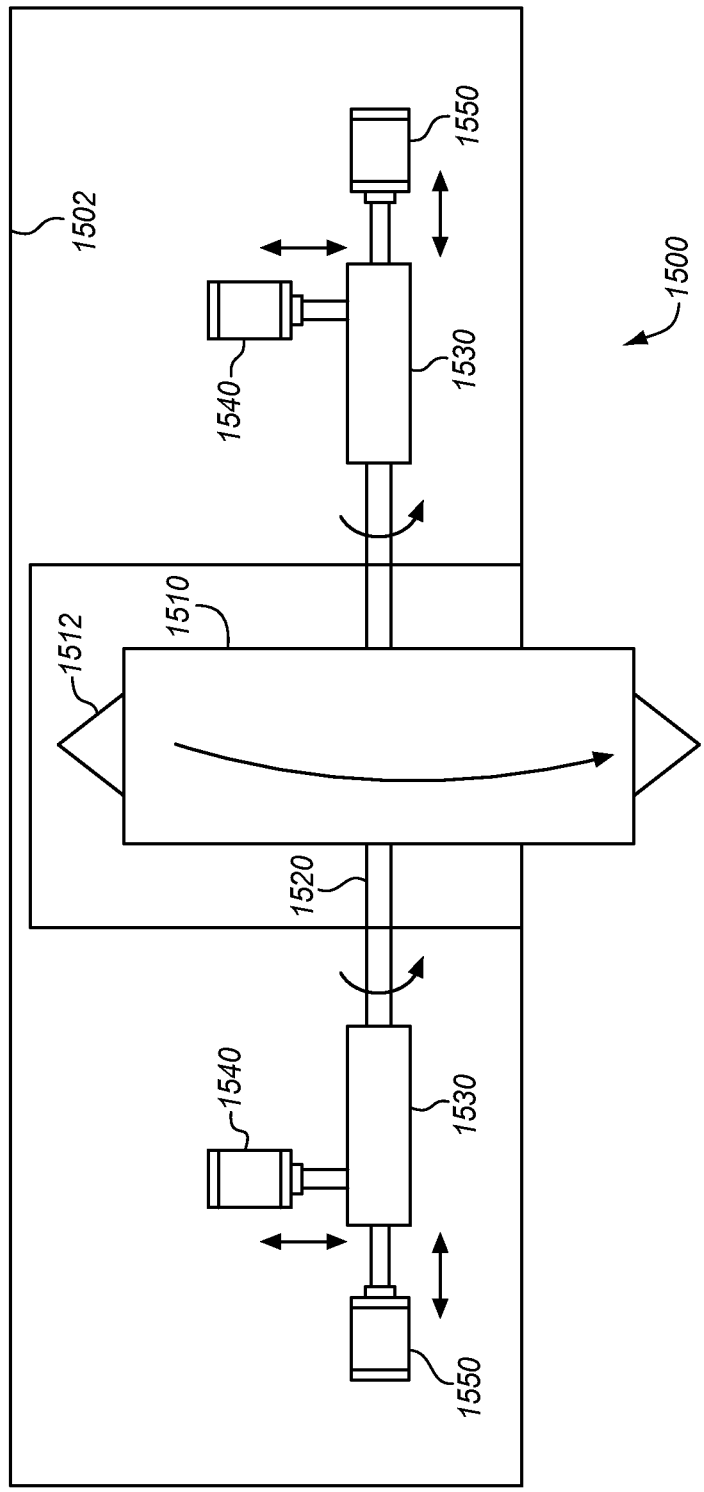
FIG. 15 is a cut-through view of an indexing head having a roller carried by a suspension in an illustrative embodiment.

FIG. 15 is a cut-through view of an indexing head 1500 having a roller 1510 carried by a suspension 1502 in an illustrative embodiment, and corresponds with view arrows 15 of FIG. 11. The roller 1510 includes a notch 1512 that is triangular in cross-section (corresponding to roller 1210) and continues along the curvature of the roller 1510, for rolling along a triangular groove. Roller 1310 and roller 1410 are capable of replacing roller 1510 if needed to match rectangular groove 1300 or semicircular groove 1400, respectively. The roller 1510 rotates about a bar 1520, and linear travel of the roller 1510 is measured by rotational sensors 1530. Suspension cylinders 1540 and 1550 (and additional suspension cylinders along an additional axis proceeding into the page) absorb deviations in position caused by the groove when the groove does not follow a nominal path, and these deviations may then be measured by a position sensor. In further embodiments, contours 126-1 and 128-1 (FIG. 11) are added to the groove or groove surface to convey additional information to different stations. In further embodiments, multiple grooves 126 and/or 128 are added to the rigid tool 125 to convey additional information to different stations, such as lamination machine 150 and downstream lamination machine 1070. For example, each groove may be utilized by a different station for different indexing purposes to conform with different sets of constraints. The information being conveyed by the grooves 126 and 128 include, but are not limited to layup patterns, ramp rates, ply orientations and other ply or laminate specifics. Additional embodiments have portions of the grooves 126 and 128 aimed at conveying information only to lamination machine 150 and other portions aimed conveying information only to downstream lamination machine 1070.

Figure 16:
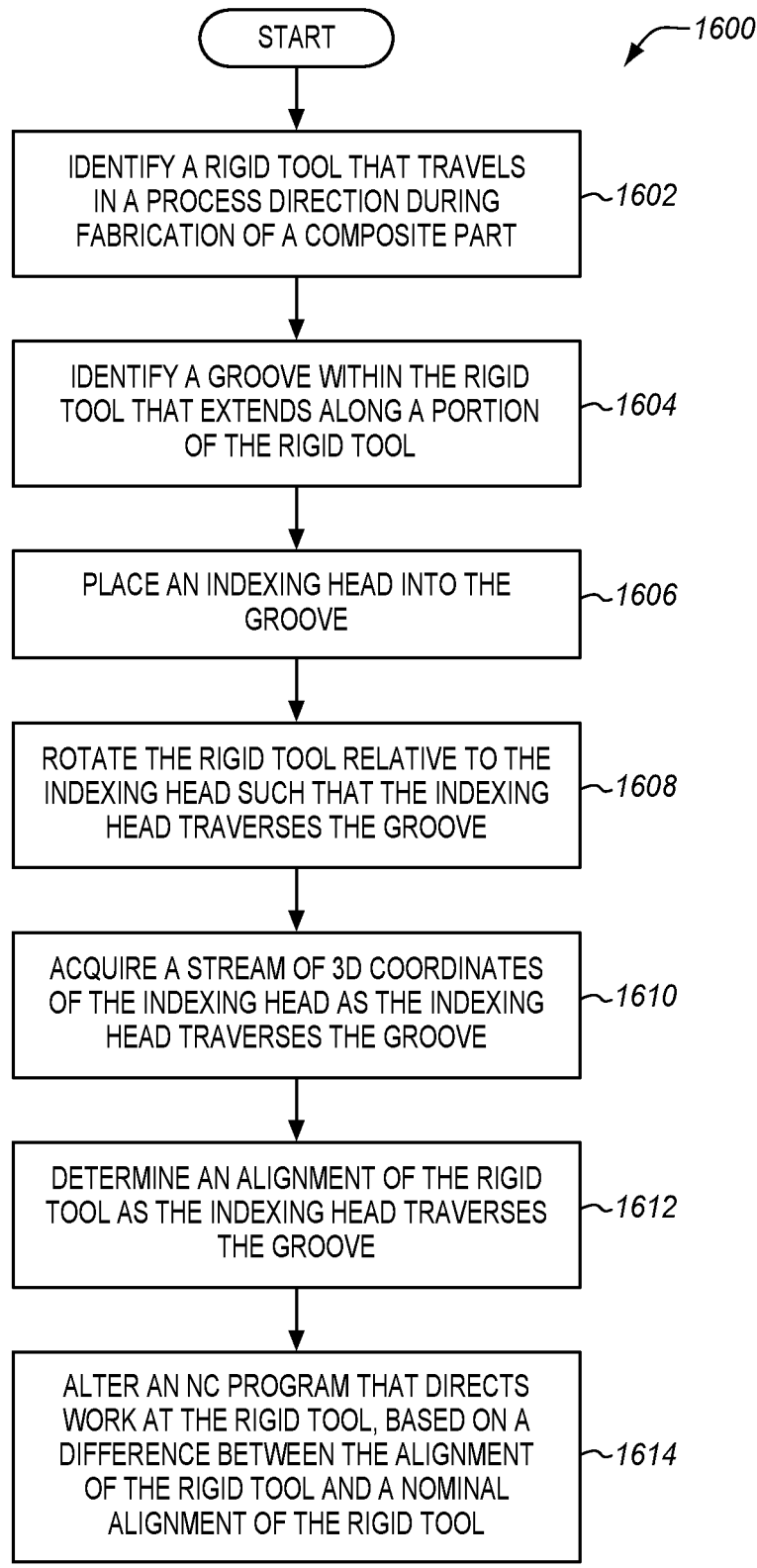
FIG. 16 is a flowchart illustrating a method for operating an indexing head that traverse a circumferential groove in a rigid tool in an illustrative embodiment.
Figure 17:
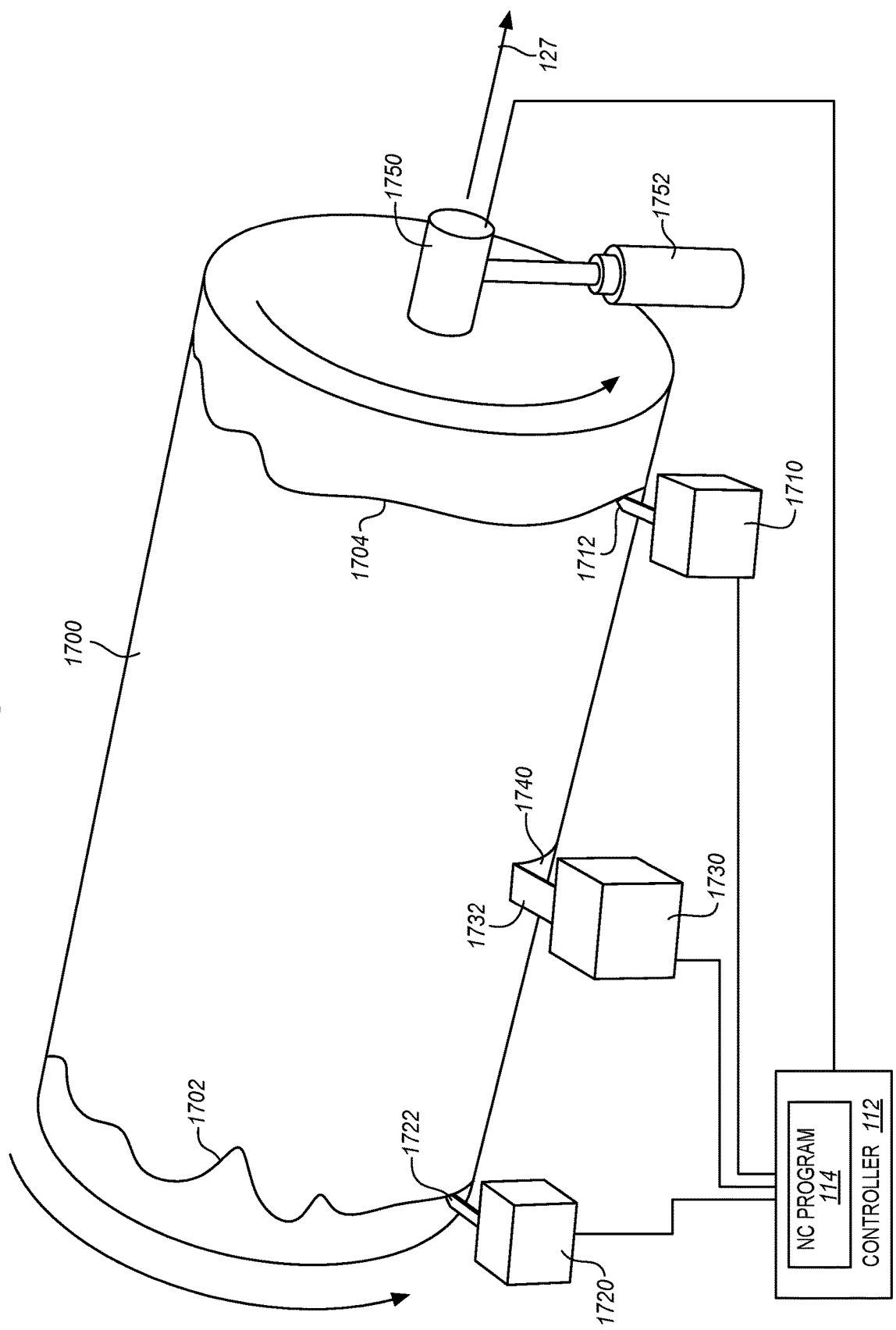
FIG. 17 is a perspective view of indexing heads that traverse circumferential grooves in a rigid tool in an illustrative embodiment.

FIG. 16 is a flowchart illustrating a method 1600 for operating an indexing head 1710 that traverses a circumferential groove 1704 in an arcuate tool 1700 in an illustrative embodiment. The operations of method 1600 are described with regard to the system depicted in FIG. 17 and includes identifying 1602 an arcuate tool 1700 that travels in a process direction 127 during fabrication of a composite part. Method 1600 is similar to method 900 of FIG. 9 provided above, except that the grooves 1702, 1704 proceed circumferentially with respect to arcuate tool 1700.

A groove 1704 is identified 1604 within the arcuate tool 1700 that extends along a portion of the arcuate tool 1700. An embodiment has groove 1704 is identified 1604 within the arcuate tool 1700 that extends along an arcuate portion of the arcuate tool 1700. This may comprise utilizing a camera to detect a position of a groove 1704 at the arcuate tool 1700, placing 1606 an indexing end 1712 of an indexing head 1710 over the groove 1704, or placing 1606 the indexing head 1710 at a location where the groove 1704 will mate with the indexing end 1712 when the arcuate tool 1700 travels in the process direction 127.

As mentioned, an indexing end 1712 is placed 1606 into the groove 1704. This may further include placing 1606 an indexing end 1722 of a second indexing head 1720 into a second groove 1702. In such an embodiment, the indexing head 1710 is downstream of the second indexing head 1720, and a lamination machine 1730 is disposed between the indexing heads 1710, 1720.

The arcuate tool 1700 is rotated 1608 relative to the indexing head 1710 such that the indexing end 1712 traverses the groove 1704. In one embodiment, this comprises rotating the arcuate tool 1700 about its central axis or via a rotatable support 1750 (held by a frame 1752) that is configured to retain the arcuate tool 1700, and that is configured to rotate the arcuate tool 1700 relative to the indexing head 1710 such that the indexing end 1712 traverses the groove 1704. In a further embodiment, this comprises moving the indexing heads 1710 and 1720 circumferentially about the arcuate tool 1700. In embodiments where the arcuate tool 1700 is moved continuously in the process direction 127, the indexing heads 1710 and 1720 match the speed of the arcuate tool 1700 to remain in position with respect to the arcuate tool 1700 as the arcuate tool 1700 moves.

A stream of 3D coordinates of the indexing head 1710, 1720 is acquired 1610 as the indexing head 1710, 1720 traverses the respective groove 1704, 1702. This input is acquired from positional sensors (not shown in FIG. 17 but similar to sensors 168 shown in FIG. 1) at the indexing heads 1710, 1720. In one embodiment, a single indexing head traverses multiple grooves of the arcuate tool 1700 (i.e., by traversing first groove 1704 over a first period of time, and by traversing second groove 1702 over a second period of time). This results in multiple streams of 3D coordinates for analysis.

An alignment of the arcuate tool 1700 is determined 1612 based on the stream of 3D coordinates. This may be performed in a similar manner to the characterizing 210 step of method 200 discussed above. A Numerical Control (NC) program 114 that directs work at the arcuate tool 1700 is altered 1614, based on a difference between the alignment of the arcuate tool 1700 and a nominal alignment of the arcuate tool 1700 as represented by 3D coordinates associated with the nominal path. This may be performed in a similar manner to the altering 212 step of method 200 discussed above.

With the NC program 114 adjusted, the lamination machine 1730 proceeds to operate its lamination head 1732 to lay up one or more tows 1740 for a laminate. The laminate is then hardened into a composite part, such as a half-barrel section of an aircraft fuselage.

Method 1600 may be particularly valuable in environments wherein a heavy arcuate tool 1700 (e.g., weighing multiple tons) is held at one end by rotatable support 1750. In such circumstances, a weight of the arcuate tool 1700 causes a minor deflection/angular deviation along the length of the arcuate tool 1700.

In still further embodiments, grooves 126, 128, 1702, 1704 comprise continuous protrusions from rigid tool 125, arcuate tool 1700 that are mated to indexing heads 170, 1710, 1720 that have pairs of rollers (e.g., one roller on either side of the protrusion). In yet further embodiments, the grooves 126, 128, 1702, 1704 are not physical grooves, but rather are painted or colored lines that are tracked by sensors in the form of high-precision cameras. The sensors may further comprise distancing sensors such as laser or ultrasonic sensors that track across the rigid tool 125, arcuate tool 1700 while measuring distance. Thus, indexing may be performed based on imaging from sensors that follow visually distinct patterns at rigid tools, without actually contacting those rigid tools and particularly by indexing head 1500.

FIG. 18 is an example report 1800 indicating a difference between a nominal position and actual position of one of the indexing heads described herein in an illustrative embodiment. The report comprises a stream of 3D coordinates acquired over time. For each measured 3D coordinate, the controller compares the coordinate to an expected 3D coordinate, and calculates a difference between the measured 3D coordinate and the expected 3D coordinate. The controller then alters instructions in an NC program for performing work (e.g., layup) at the rigid tool being indexed, by identifying positions indicated in the instructions, and applying corresponding differences in position to the instructions.

Examples

Figure 19:
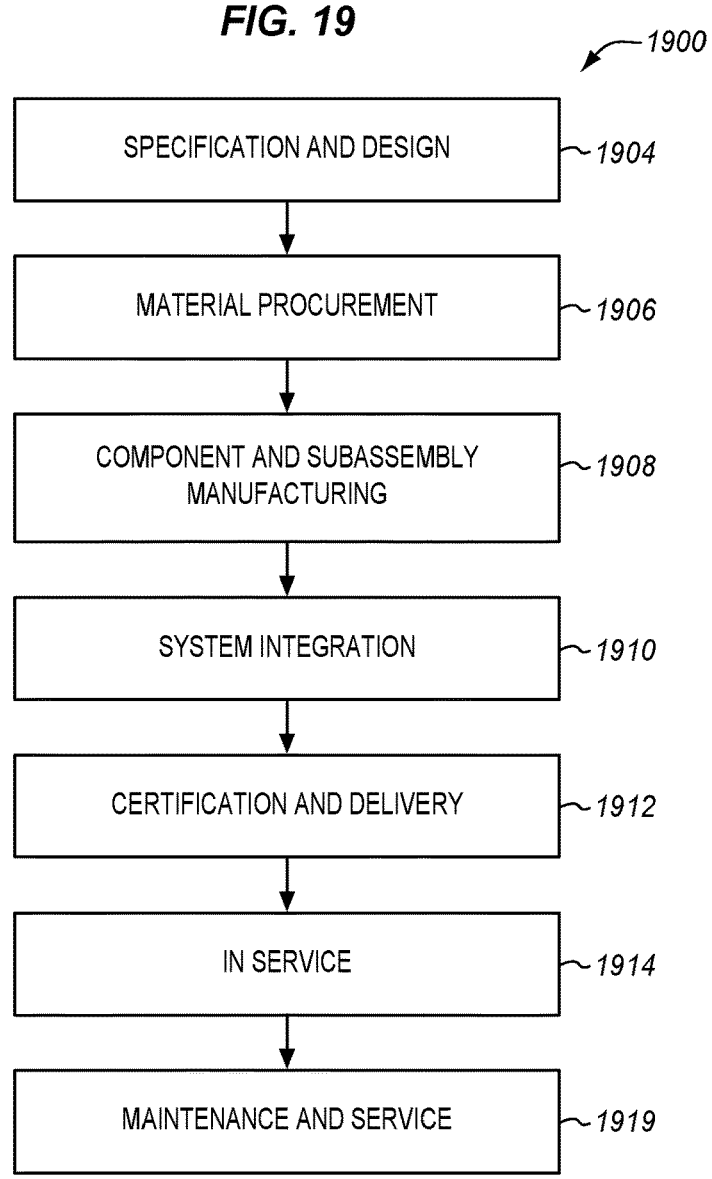
FIG. 19 is a flow diagram of aircraft production and service methodology in an illustrative embodiment.
Figure 20:
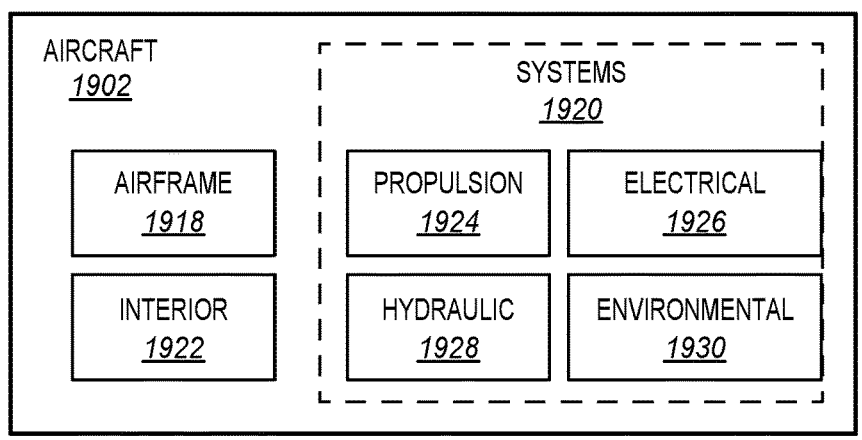
FIG. 20 is a block diagram of an aircraft in an illustrative embodiment.

Referring more particularly to the drawings, embodiments of the disclosure may be described in the context of aircraft manufacturing and service in method 1900 as shown in FIG. 19 and an aircraft 1902 as shown in FIG. 20. During pre-production, method 1900 may include specification and design 1904 of the aircraft 1902 and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine work in maintenance and service 1916 (which may also include modification, reconfiguration, refurbishment, and so on). Apparatus and methods embodied herein may be employed during any one or more suitable stages of the production and service described in method 1900 (e.g., specification and design 1904, material procurement 1906, component and subassembly manufacturing 1908, system integration 1910, certification and delivery 1912, service 1914, maintenance and service 1919) and/or any suitable component of aircraft 1902 (e.g., airframe 1918, systems 1920, interior 1922, propulsion system 1924, electrical system 1926, hydraulic system 1928, environmental system 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 1902 produced by method 1900 may include an airframe 1918 with a plurality of systems 1920 and an interior 1922. Examples of systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1900. For example, components or subassemblies corresponding to component and subassembly manufacturing 1908 may be fabricated or manufactured in a manner similar to components or subassemblies produced while the aircraft 1902 is in service. Also, one or more apparatus embodiments, method embodiments, or a combination thereof may be utilized during the subassembly manufacturing 1908 and system integration 1910, for example, by substantially expediting assembly of or reducing the cost of an aircraft 1902. Similarly, one or more of apparatus embodiments, method embodiments, or a combination thereof may be utilized while the aircraft 1902 is in service, for example and without limitation during the maintenance and service 1916. Thus, the invention may be used in any stages discussed herein, or any combination thereof, such as specification and design 1904, material procurement 1906, component and subassembly manufacturing 1908, system integration 1910, certification and delivery 1912, service 1914, maintenance and service 1916 and/or any suitable component of aircraft 1902 (e.g., airframe 1918, systems 1920, interior 1922, propulsion system 1924, electrical system 1926, hydraulic system 1928, and/or environmental system 1930.

In one embodiment, a part comprises a portion of airframe 1918, and is manufactured during component and subassembly manufacturing 1908. The part may then be assembled into an aircraft in system integration 1910, and then be utilized in service 1914 until wear renders the part unusable. Then, in maintenance and service 1916, the part may be discarded and replaced with a newly manufactured part. Inventive components and methods may be utilized throughout component and subassembly manufacturing 1908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:
1. A method for indexing a layup mandrel for a composite part, the method comprising:
identifying a first side surface and a layup surface of the layup mandrel, wherein the layup mandrel travels in a process direction between serially arranged workstations during fabrication of the composite part;
placing a lamination head in contact with the first side surface;
traversing the first side surface of the layup mandrel with the lamination head;
acquiring a stream of 3D coordinates of the lamination head as the lamination head traverses the first side surface;
characterizing the layup mandrel based on the stream of 3D coordinates; and
altering a Numerical Control (NC) program that directs layup of fiber reinforced material on the layup surface at the layup mandrel, based on a difference between an alignment of the layup mandrel and a nominal alignment of the layup mandrel.

2. The method of claim 1 wherein:
traversing the first side surface comprises holding a roller of the lamination head in contact with the first side surface, the roller traversing the first side surface in accordance with an indexing NC program that directs the roller to follow a nominal path along the layup mandrel, the roller deflecting when the first side surface deviates from the nominal path;
comparing the acquired stream of 3D coordinates to the nominal path to determine differences in position from the nominal path; and wherein
altering comprises integrating the differences into the NC program that directs the layup of the fiber reinforced material at the layup mandrel.

3. The method of claim 1 wherein acquiring the stream of 3D coordinates of the lamination head comprises measuring positional offsets of components of a suspension that enable a roller of the lamination head to deflect for later comparison to a nominal path.

4. The method of claim 1 further comprising:
laying up a laminate onto the layup mandrel in accordance with the NC program;
acquiring a second stream of 3D coordinates of a roller of the lamination head during the laying up;
transporting the layup mandrel in the process direction to a downstream lamination head;
passing the second stream of 3D coordinates to a controller of the downstream lamination head; and
determining an alignment of the layup mandrel at the downstream lamination head based on the second stream of 3D coordinates.

5. The method of claim 4 further comprising:
placing the roller in contact with a second side surface of the layup mandrel;
traversing the second side surface with the roller of the lamination head; and
acquiring the second stream of 3D coordinates of the roller as the roller traverses the second side surface.

6. The method of claim 5 further comprising:
operating the lamination head in accordance with the NC program to lay up fiber reinforced material in a layup region between the first side surface and the second side surface.

7. The method of claim 1 further comprising altering the NC program in real time to accommodate a thickness of fiber reinforced material already placed upon the layup mandrel.

8. A method for indexing a rigid tool for a composite part, the method comprising:
identifying a groove formed in the rigid tool and that extends in a process direction, wherein the rigid tool travels in the process direction during fabrication of the composite part;
placing an indexing head with respect to the groove;
traversing the indexing head along the groove;
acquiring a stream of 3D coordinates of the indexing head as the indexing head traverses the groove;
determining an alignment of the rigid tool based on the stream of 3D coordinates; and
altering a Numerical Control (NC) program that directs work at the rigid tool, based on a difference between the alignment of the rigid tool and a nominal alignment of the rigid tool.

9. The method of claim 8 wherein the groove includes a non-repeating series of unique curves, the method further comprising identifying a position of the indexing head at the rigid tool, based on 3D coordinates in the stream that are indicative of one of the unique curves in the non-repeating series.

10. The method of claim 8 wherein:
identifying the groove upon the rigid tool comprises one or more of:
identifying a continuous protrusion upon the rigid tool; and
identifying one or more lines upon the rigid tool; and
placing the indexing head with respect to the groove comprises one or more of:
mating rollers of the indexing head with the continuous protrusion; and
tracking the one or lines using one or more cameras.

11. The method of claim 8 wherein the rigid tool includes a first groove and a second groove that both extend in a process direction, and wherein:
traversing the indexing head comprises traversing both the first groove and the second groove using at least one indexing head;
acquiring a stream of 3D coordinates comprises acquiring a stream of 3D coordinates for each of the first groove and the second groove; and
determining an alignment of the rigid tool comprises determining the alignment of the rigid tool based on both streams of 3D coordinates.

12. The method of claim 8 wherein placing the indexing head with respect to the groove comprises pressing an indexing end of the indexing head into the groove.

13. The method of claim 12 wherein traversing the indexing head along the groove comprises moving the indexing head along a nominal path, with the indexing end remaining in the groove.

14. The method of claim 13 wherein acquiring the stream of 3D coordinates of the indexing head comprises determining deflections of the indexing head from the nominal path as the indexing end travels along the groove.

15. The method of claim 8 further comprising:
replacing the indexing head with a lamination head; and
performing layup by dispensing fiber reinforced material from the lamination head.

16. The method of claim 8 wherein traversing the indexing head along the groove comprises rolling an indexing end of the indexing head along the groove.

17. The method of claim 8 wherein acquiring the stream of 3D coordinates of the indexing head comprises determining an arc and an orientation of the arc of the indexing head as the indexing head traverses the groove.

18. The method of claim 8 wherein traversing the indexing head comprises traversing the groove in accordance with an indexing NC program that directs the indexing head to follow a nominal path along the rigid tool, an indexing end of the indexing head pressed into the groove during the traversing.

19. The method of claim 18 wherein determining the alignment of the rigid tool comprises comparing the stream of 3D coordinates from the indexing head to the 3D coordinates of the nominal path to determine deviations of the groove from the nominal path.

20. The method of claim 19 wherein altering the Numerical Control (NC) program comprises integrating the deviations into the NC program that lays up composite on the rigid tool.

21. A system for indexing a layup mandrel for a composite part, the system comprising:
  a lamination head comprising:
    a roller;
    a suspension that enables deflection of the roller;
    a position sensor that measures deflection of the roller; and
    a dispenser that dispenses tows of fiber-reinforced material; and
  a controller that identifies a first side surface and a layup surface of the layup mandrel, wherein the layup mandrel travels in a process direction between serially arranged workstations during fabrication of the composite part, directs the lamination head to place the roller in contact with the first side surface, directs the lamination head to traverse the first side surface with the roller, acquires a stream of 3D coordinates of the roller as the roller traverses the first side surface, determines an alignment of the layup mandrel based on the stream of 3D coordinates, and alters a Numerical Control (NC) program that directs layup of fiber reinforced material at the layup mandrel, based on a difference between the alignment of the layup mandrel and a nominal alignment of the layup mandrel.

22. The system of claim 21 further comprising:
  a downstream lamination head, wherein:
    the controller operates the lamination head to:
      lay up a laminate onto the layup mandrel in accordance with the NC program;
      acquire a second stream of 3D coordinates of the roller during the laying up; and
      pass the second stream of 3D coordinates to controller in order to control operation of the downstream lamination head.

23. A system for indexing a rigid tool with respect to a lamination machine, the system comprising:
  an indexing head comprising an indexing end;
  position sensors that measure 3D coordinates of the indexing end of the indexing head; and
  a controller that:
    identifies a groove formed in the rigid tool, the groove extending in a process direction and wherein the rigid tool travels in the process direction during fabrication of a composite part;
    directs placement of the indexing end into the groove;
    directs the indexing head to traverse the groove;
    acquires a stream of 3D coordinates of the indexing head via the position sensors as the indexing head traverses the groove with the indexing end therein;
    determines an alignment of the rigid tool based on the acquired stream of 3D coordinates; and
    alters a Numerical Control (NC) program that directs work at the rigid tool, based on a difference between the determined alignment of the rigid tool and a nominal alignment of the rigid tool.

24. The system of claim 23 wherein the indexing end is configured to traverse the groove.

25. The system of claim 23 wherein:
  the indexing head is configured to apply a pressure to the indexing end within the groove while the indexing end traverses the groove, such that the indexing head deflects from the nominal path when the groove deviates from a nominal path.

26. The system of claim 25 wherein the controller is configured to:
  direct the indexing head to traverse the groove in accordance with an indexing NC program that directs the indexing head to follow a nominal path along the rigid tool;
  compare the acquired stream of 3D coordinates from the indexing head to the nominal path to determine differences in position from the nominal path; and
  integrates the differences in position into the NC program that directs placement of composite material at the rigid tool.

27. A method for indexing an arcuate tool for a composite part, the method comprising:
  identifying a groove formed in the arcuate tool that extends circumferentially along a portion of the arcuate tool;
  placing an indexing head with respect to the groove;
  rotating the arcuate tool relative to the indexing head such that the indexing head traverses the groove;
  acquiring a stream of 3D coordinates of the indexing head as the indexing head traverses the groove;
  determining an alignment of the arcuate tool based on the acquired stream of 3D coordinates; and
  altering a Numerical Control (NC) program that directs work at the arcuate tool, based on a difference between the alignment of the arcuate tool and a nominal alignment of the arcuate tool.

28. The method of claim 27 wherein:
  determining an alignment of the arcuate tool based on the acquired stream of 3D coordinates comprises comparing the acquired stream of 3D coordinates to 3D coordinates associated with a nominal path to determine differences in position of the arcuate tool from the nominal path; and
  altering a Numerical Control (NC) program comprises integrating the differences in position to the NC program that directs work at the arcuate tool.

29. The method of claim 27 wherein placing the indexing head comprises:
  placing a first indexing end of a first indexing head with respect to a first groove of the arcuate tool that is upstream of a lamination machine; and
  placing a second indexing end of a second indexing head into a second groove that is downstream of the lamination machine.

30. A system for indexing an arcuate tool for composite part fabrication, the system comprising:
  an indexing head comprising an indexing end and position sensors that measure 3D coordinates of the indexing head with respect to the indexing end;
  an arcuate tool comprising at least one groove formed in an arcuate portion of the arcuate tool and extends circumferentially along the arcuate portion of the arcuate tool;

a rotatable support that is configured to retain the arcuate tool, and further configured to rotate the arcuate tool relative to the indexing head such that the indexing end traverses the groove; and a controller that identifies the groove formed in the arcuate portion of the arcuate tool, that directs placement of the indexing head with respect to the arcuate tool, directs the rotatable support to rotate the arcuate tool, acquires a stream of 3D coordinates indicative of a position of the indexing head as the indexing end traverses the groove, determines an alignment of the arcuate tool with respect to a nominal tool alignment based on the acquired stream of 3D coordinates, and alters a Numerical Control (NC) program that directs composite layup work at the arcuate tool, based on a difference between the determined alignment of the arcuate tool and the nominal alignment of the arcuate tool.

31. The system of claim 30 wherein to identify a position of the indexing head with respect to the arcuate tool, the controller is configured to utilize the 3D coordinates in the acquired stream to recognize a non-repeating series of unique curves in the groove thereby identifying a position of the indexing head with respect to the arcuate tool.

32. The system of claim 30 further comprising a second indexing head comprising a second indexing end wherein:

the indexing end of the indexing head is placed with respect to the groove of the arcuate tool, the groove being upstream of a lamination machine; and the second indexing end of the second indexing head is placed with respect to a second groove of the arcuate tool that is downstream of the lamination machine.

33. The system of claim 32 wherein the groove of the arcuate tool and the second groove of the arcuate tool are operable to convey information to the controller, via the indexing end and the second indexing end, including at least one of: layup patterns, ramp rates, and ply orientations.

* * * * *